(12) United States Patent
Degraye et al.

(10) Patent No.: US 10,839,807 B2
(45) Date of Patent: Nov. 17, 2020

(54) SYSTEMS AND METHODS FOR VOICE IDENTIFICATION AND ANALYSIS

(71) Applicant: HED Technologies Sarl, Geneva (CH)

(72) Inventors: Timothy Degraye, Geneva (CH); Liliane Huguet, Geneva (CH)

(73) Assignee: HED Technologies Sarl, Geneva (CH)

( * ) Notice: Subject to any disclaimer, the term of this patent is extended or adjusted under 35 U.S.C. 154(b) by 0 days.

(21) Appl. No.: 16/732,291

(22) Filed: Dec. 31, 2019

(65) Prior Publication Data

US 2020/0211561 A1    Jul. 2, 2020

Related U.S. Application Data

(60) Provisional application No. 62/786,915, filed on Dec. 31, 2018.

(51) Int. Cl.
| | |
|---|---|
| *G10L 15/00* | (2013.01) |
| *G10L 15/26* | (2006.01) |
| *G10L 15/30* | (2013.01) |
| *G10L 15/28* | (2013.01) |

(52) U.S. Cl.
CPC .......... *G10L 15/265* (2013.01); *G10L 15/285* (2013.01); *G10L 15/30* (2013.01)

(58) Field of Classification Search
None
See application file for complete search history.

(56) References Cited

U.S. PATENT DOCUMENTS

| | | | | |
|---|---|---|---|---|
| 6,937,266 B2* | 8/2005 | Rui | ........................ | H04N 7/142 |
| | | | | 348/14.05 |
| 7,139,767 B1* | 11/2006 | Taylor | ..................... | G06F 16/50 |
| 7,298,930 B1* | 11/2007 | Erol | ................... | G06K 9/00711 |
| | | | | 382/305 |

(Continued)

OTHER PUBLICATIONS

International Patent Application No. PCT/US2019/069165, International Search Report and Written Opinion dated Mar. 18, 2020, 12 pages.

*Primary Examiner* — Douglas Godbold
(74) *Attorney, Agent, or Firm* — Sheppard, Mullin, Richter & Hampton LLP

(57) ABSTRACT

Obtaining configuration audio data including voice information for a plurality of meeting participants. Generating localization information indicating a respective location for each meeting participant. Generating a respective voiceprint for each meeting participant. Obtaining meeting audio data. Identifying a first meeting participant and a second meeting participant. Linking a first meeting participant identifier of the first meeting participant with a first segment of the meeting audio data. Linking a second meeting participant identifier of the second meeting participant with a second segment of the meeting audio data. Generating a GUI indicating the respective locations of the first and second meeting participants, and the GUI indicating a first transcription of the first segment and a second transcription of the second segment. The first transcription is associated with the first meeting participant in the GUI, and the second transcription is associated with the second meeting participant in the GUI.

20 Claims, 10 Drawing Sheets

(56) References Cited

U.S. PATENT DOCUMENTS

| | | | |
|---|---|---|---|
| 7,428,000 B2* | 9/2008 | Cutler | H04N 7/15 348/14.08 |
| 9,031,614 B2* | 5/2015 | Caspi | G06F 21/32 379/88.01 |
| 9,077,849 B2* | 7/2015 | Meek | G06Q 10/06 |
| 9,191,616 B2* | 11/2015 | Krantz | H04N 7/147 |
| 9,601,132 B2* | 3/2017 | Son | H04R 1/326 |
| 9,883,018 B2* | 1/2018 | Kim | H04M 1/656 |
| 10,248,934 B1* | 4/2019 | Shen | G06F 16/24568 |
| 10,586,541 B2* | 3/2020 | Kashtan | G10L 17/22 |
| 2009/0089055 A1* | 4/2009 | Caspi | H04M 3/56 704/235 |
| 2010/0085415 A1 | 4/2010 | Rahman | |
| 2010/0305945 A1* | 12/2010 | Krishnaswamy | G10L 15/26 704/235 |
| 2014/0136203 A1* | 5/2014 | Liu | H04R 29/002 704/246 |
| 2014/0244252 A1 | 8/2014 | Dines et al. | |
| 2017/0150255 A1 | 5/2017 | Wang et al. | |
| 2019/0259387 A1* | 8/2019 | Mertens | G06F 40/166 |
| 2019/0341055 A1* | 11/2019 | Krupka | G10L 25/84 |
| 2019/0341058 A1* | 11/2019 | Zhang | G06N 3/0454 |
| 2019/0392837 A1* | 12/2019 | Jung | G10L 15/22 |

* cited by examiner

SYSTEMS AND METHODS FOR VOICE IDENTIFICATION AND ANALYSIS

CROSS-REFERENCE TO RELATED APPLICATIONS

The present application claims the benefit of U.S. Provisional Patent Application Ser. 62/786,915, filed Dec. 31, 2018 and entitled "System and Method of Identifying Speakers in a Meeting and Transcribing Speech to Text," which is hereby incorporated by reference herein.

TECHNICAL FIELD

This disclosure pertains to voice identification. More specifically, this disclosure pertains to voice identification and analysis.

BACKGROUND

Under conventional approaches, speech may be transcribed into text. However, typical solutions cannot accurately identify speakers in environments with multiple speakers. Accordingly, typical solutions cannot accurately attribute speech to the speaker in environments with multiple speakers.

SUMMARY

A claimed solution rooted in computer technology overcomes problems specifically arising in the realm of computer technology. In various embodiments, a computing system is configured to automatically identify meeting participants (e.g., Patrick, Thomas, Corinne and Samir) of a meeting, and also identify locations of the meeting participants of the meeting. More specifically, the computing system may obtain configuration audio data including voice information for the meeting participants reciting a configuration phrase (e.g., "Hello, my name is <insert meeting participant name>" and/or "The cat jumps over the lazy dog"). The voice information may be captured by one or more microphones of a recording device. The computing system may generate localization information based on the configuration audio data (e.g., using use cross-correlation-based algorithms, such as SRP-PHAT, MULTI-PHAT, and/or the like) that indicates a respective location for each of the of meeting participants. For example, the computing system may determine that Thomas and Samir are located across from Patrick and Corinne.

The computing system may also generate a voiceprint for each meeting participant based on the configuration phrase, and associate the voiceprint with the name provided in the configuration phrase. For example, a voiceprint may be generated associated with Patrick, another voiceprint may be generated and associated with Thomas, and so forth. The computing system may transcribe the meeting, and use the localization information and/or the voiceprints to not only determine that there are different voices in the meeting, but also automatically and accurately attribute speech of the meeting to the various meeting participants. For example, rather than generating a transcription that uses generic names (e.g., "Speaker #1," "Speaker #2"), or not delineating between different voices at all, the computing system may generate reports and holistic graphical user interfaces which not only provide a meeting transcriptions, but also indicate locations of meeting participants, when a meeting participant spoke, audio clips of the meeting, and/or the like.

Various embodiments of the present disclosure include systems, methods, and non-transitory computer readable media configured to obtain configuration audio data. The configuration audio may include voice information for a plurality of meeting participants. The voice information may be captured by one or more microphones of a plurality of microphones. Generate localization information based on the configuration audio data. The localization information may indicate a respective location for each of the plurality of meeting participants. Generate, based on the configuration audio data and the localization information, a respective voiceprint for each of the plurality of meeting participants. Obtain meeting audio data. Identify, based on the localization information and the respective voiceprints, at least a first meeting participant and a second meeting participant of the plurality of meeting participants. Link, based on the identification of the first meeting participant of the plurality of meeting participants, a first meeting participant identifier of the first meeting participant with a first segment of the meeting audio data. Link, based on the identification of the second meeting participant of the plurality of meeting participants, a second meeting participant identifier of the second meeting participant with a second segment of the meeting audio data. The meeting audio data may be obtained during a first time period. The identification of the first and second meeting participants, as well as the linkings, may also be performed during the first time period. Generate holistic a graphical user interface (GUI) indicating the respective locations of the first and second meeting participants of the plurality of meeting participants. The holistic GUI may further indicate a first transcription of the first segment and a second transcription of the second segment. The first transcription may be associated with the first meeting participant in the holistic GUI, and the second transcription may be associated with the second meeting participant in the holistic GUI. In some embodiments, the holistic GUI may be generated based on the linkings.

In some embodiments, the systems, methods, and non-transitory computer readable media further configured to perform, at least during a second time period subsequent to the first time period: obtaining additional meeting audio data; identifying, based on the respective voiceprints and without using the localization information, at least the first meeting participant and the second meeting participant of the plurality of meeting participants; linking, based on the identification of the first meeting participant without using the localization information, the first meeting participant identifier of the first meeting participant with a first segment of the additional meeting audio data; and linking, based on the identification of the second meeting participant without using the localization information, the second meeting participant identifier of the second meeting participant with a second segment of the additional meeting audio data.

In some embodiments, the systems, methods, and non-transitory computer readable media further configured to perform: receiving user feedback associated with the linking the first meeting participant identifier of the first meeting participant with the first segment of the additional meeting audio data; unlinking, based on the user feedback, the first meeting participant identifier of the first meeting participant with the first segment of the additional meeting audio data; and updating, based on the unlinking, the voiceprint of the first meeting participant.

In some embodiments, the systems, methods, and non-transitory computer readable media further configured to perform: linking, based on additional user feedback, a third meeting participant identifier of a third meeting participant of the plurality of meeting participants with the first segment of the meeting audio data; and updating, based on the linking of the third meeting participant identifier with the first segment of the meeting audio data, the voiceprint of the third meeting participant.

In some embodiments, the holistic GUI indicates a third transcription of the first segment and a fourth transcription of the second segment, the third transcription being associated with the first meeting participant in the holistic GUI, and the fourth transcription being associated with the second meeting participant in the holistic GUI.

In some embodiments, the holistic GUI indicates a first voice recording of the first segment and a second voice recording of the second segment, the first voice recording being associated with the first meeting participant in the holistic GUI, and the second voice recording being associated with the second meeting participant in the holistic GUI.

In some embodiments, each of the first and second voice recordings may be played back within the holistic GUI responsive to user input.

In some embodiments, a first set of microphones of the plurality of microphones is disposed in a first directional audio recording device, and a second set of microphones of the plurality of microphones is disposed in a second directional audio recording device distinct and remote from the first directional audio recording device.

In some embodiments, a first segment of the meeting audio data is captured by the first directional audio recording device, and the second segment of the meeting audio data is captured by the second directional audio recording device.

In some embodiments, the voice information includes voice audio data and signal strength data associated with the voice audio data.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

DETAILED DESCRIPTION

A claimed solution rooted in computer technology overcomes problems specifically arising in the realm of computer technology. In various embodiments, a computing system is configured to automatically identify meeting participants (e.g., Patrick, Thomas, Corinne and Samir) of a meeting, and also identify locations of the meeting participants of the meeting. More specifically, the computing system may obtain configuration audio data including voice information for the meeting participants reciting a configuration phrase (e.g., "Hello, my name is <insert meeting participant name>" and/or "The cat jumps over the lazy dog"). The voice information may be captured by one or more microphones of a recording device. The computing system may generate localization information based on the configuration audio data (e.g., using use cross-correlation-based algorithms, such as SRP-PHAT, MULTI-PHAT, and/or the like) that indicates a respective location for each of the of meeting participants. For example, the computing system may determine that Thomas and Samir are located across from Patrick and Corinne.

The computing system may also generate a voiceprint for each meeting participant based on the configuration phrase, and associate the voiceprint with the name provided in the configuration phrase. For example, a voiceprint may be generated associated with Patrick, another voiceprint may be generated and associated with Thomas, and so forth. The computing system may transcribe the meeting, and use the localization information and/or the voiceprints to not only determine that there are different voices in the meeting, but also automatically and accurately attribute speech of the meeting to the various meeting participants. For example, rather than generating a transcription that uses generic names (e.g., "Speaker #1," "Speaker #2"), or not delineating between different voices at all, the computing system may generate reports and holistic graphical user interfaces which not only provide a meeting transcriptions, but also indicate locations of meeting participants, when a meeting participant spoke, audio clips of the meeting, and/or the like.

Figure 1:
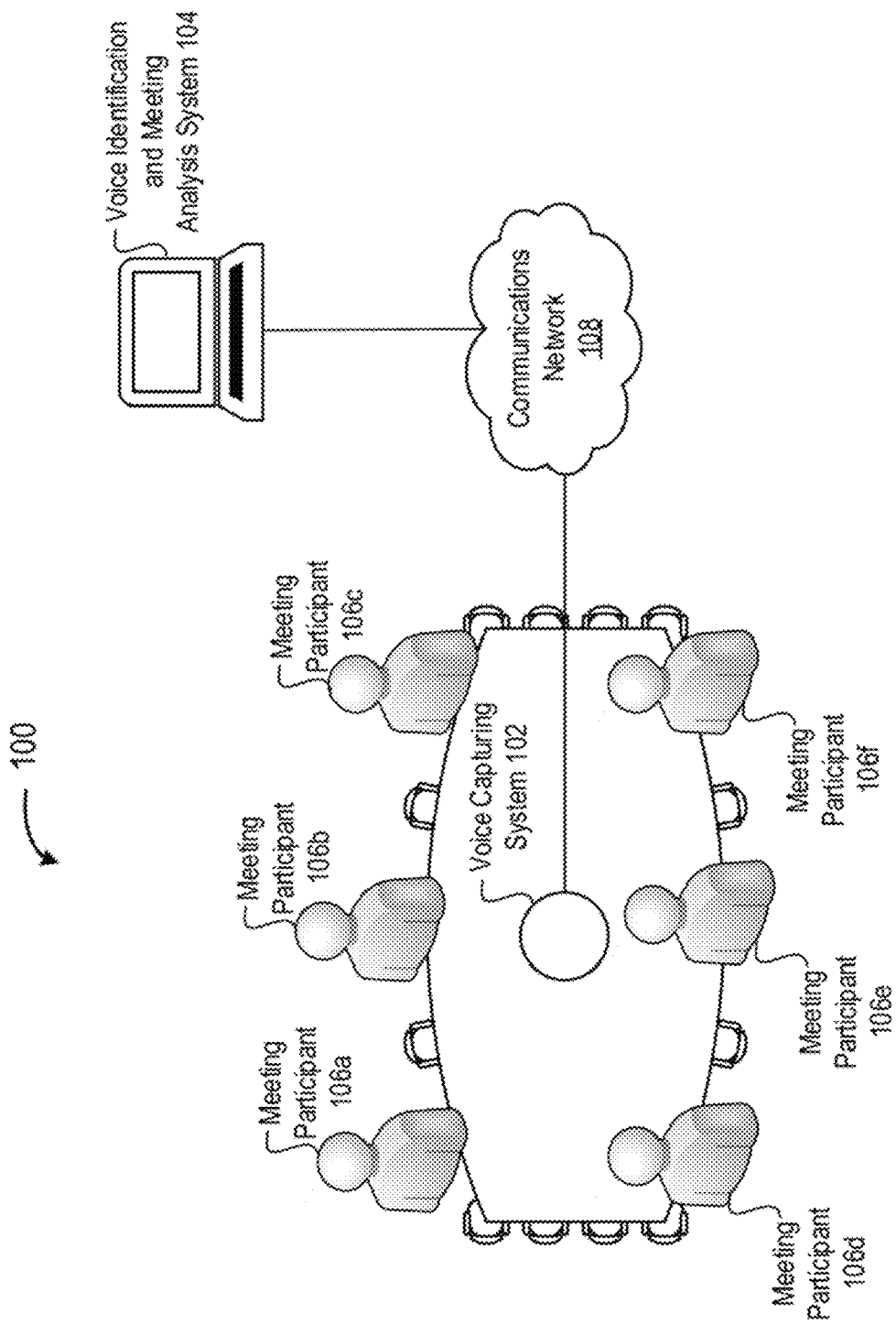
FIG. 1 depicts a diagram of an example system for identifying voices and participants of a meeting, transcribing speech of those voices, and generating corresponding holistic graphical user interfaces according to some embodiments.

FIG. 1 depicts a diagram of an example system and environment 100 for identifying voices and participants of a meeting, transcribing speech of those voices, and generating corresponding holistic graphical user interfaces according to some embodiments. In the example of FIG. 1, the system and environment 100 includes a voice capturing system 102, a voice identification and meeting analysis system 104, meeting participants (or, "users") 106a-f (individually, the meeting participant 106, collectively, the meeting participants, 106), and a communications network 108.

The voice capturing system 102 may function to record voices of meeting participants 106 of a meeting. In various embodiments, functionality of the voice capturing system 102 may be implemented by one or more recording devices. The voice capturing system 102 may include one or more microphones (e.g., unidirectional and/or omnidirectional microphones) for recording speech (or, voices) and/or other audio during a meeting. In some embodiments, functionality of the voice capturing system 102 may be implemented by one or more devices of the type shown in FIG. 5. In other embodiments, functionality of the voice capturing system 102 may be implemented by one or more mobile devices (e.g., smartphones, tablet computers). Although one voice capturing system 102 is shown here, multiple voice capturing systems 102 may be used to record voices of meeting participants 106, as discussed elsewhere herein.

The voice identification and meeting analysis system 104 may function to automatically identify meeting participants 106 of a meeting. In various embodiments, functionality of the voice identification and meeting analysis system 104 may be performed by one or more computing devices, such laptop computers, desktop computers, mobile devices (e.g., smartphones, tablet computers), servers (e.g., a cloud-based server) and/or other computing devices.

In some embodiments, the voice identification and meeting analysis system 104 functions to automatically identify meeting participants 106 based on their location and/or their voiceprints to determine locations of meeting participants 106. For example, each meeting participant 106 may recite one or more configuration phrases (e.g., "Hello, my name is <insert meeting participant name>" and/or "The cat jumps over the lazy dog") prior to the start of a meeting. The voice capturing system 102 may record the recited configuration phrases. The voice identification and meeting analysis system may generate a voiceprint based on the recorded phrases and the corresponding recited meeting participant name (e.g., Patrick). The recorded configuration phrases may also have a corresponding signal value (e.g., signal strength values) for each of the microphones of the voice capturing system 104. The voice identification and meeting analysis system may use the signal values to determine location of the meeting participants 106.

In one example, a meeting may have two locations, such as a "left side" and a "right side." There may be three meeting participants (e.g., meeting participants 106a-c) on the left side and three meeting participants (e.g., meeting participants 106d-f) on the right side. The voice identification and meeting analysis system 104 may determine that the voice originated from the left side location. Accordingly, the voice identification and meeting analysis system may use voiceprints to identify the speaking meeting participant from among the three meeting participants on the left side location, rather than from among all six of the meeting participants. Although two locations and six participants are described in this example, any number of such locations and/or any number of such meeting participants may be used.

In some embodiments, the voice identification and meeting analysis system 104 functions to update voiceprints. For example, when the voice identification and meeting analysis system 104 generates a voiceprint for a meeting participant 106 (e.g., as described above), the voice identification and meeting analysis system 104 may store the voiceprint in a corresponding user profile. The voice identification and meeting analysis system may progressively update and/or improve the voiceprint as more audio data is collected. The voice identification and meeting analysis system may also update and/or improve voiceprints based on user feedback. For example, the voice identification and meeting analysis system may initially associate a particular voice in a meeting to Patrick (e.g., based on localization and/or voiceprints), but a user may provide feedback indicating that the particular voice is not Patrick (e.g., the voice belongs to Samir). The voice identification and meeting analysis system 104 may update Patrick's and/or Samir's voiceprints (e.g., remove that portion of the audio data from a set of audio data used to determine Patrick's voiceprint, and/or add that portion of audio data to a set of audio used to determine Samir's voiceprint).

In some embodiments, the voice identification and meeting analysis system 104 functions to convert speech to text (or, transcribe) meeting audio data. For example, the voice identification and meeting analysis system may use proprietary transcription rules and/or application programming interfaces (APIs) to access third-party transcription services (e.g., NUANCE and GOOGLE).

Figure 3:
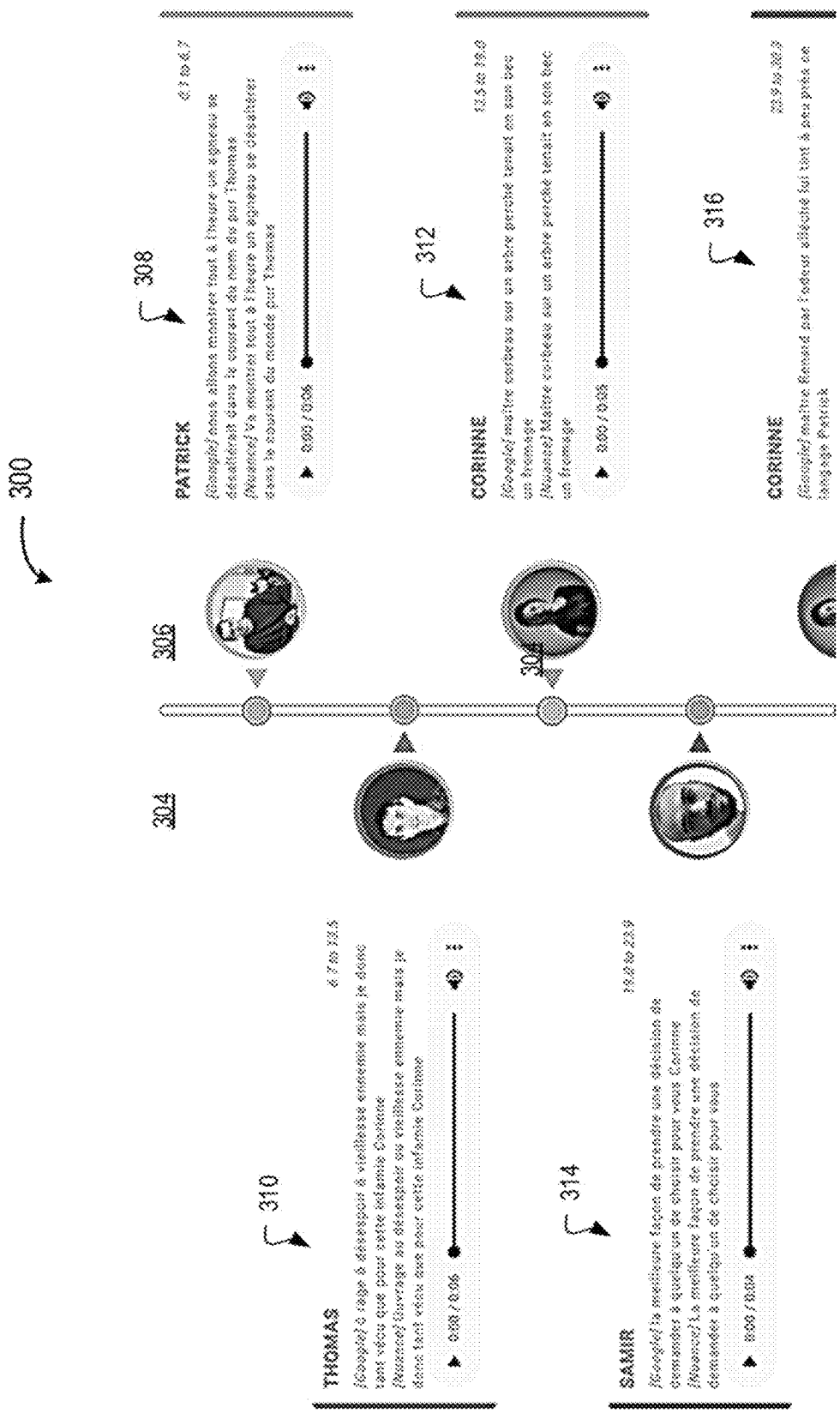
FIG. 3 depicts an example of a holistic graphical user interface including a speech timeline and location of meeting participants according to some embodiments.
Figure 4:
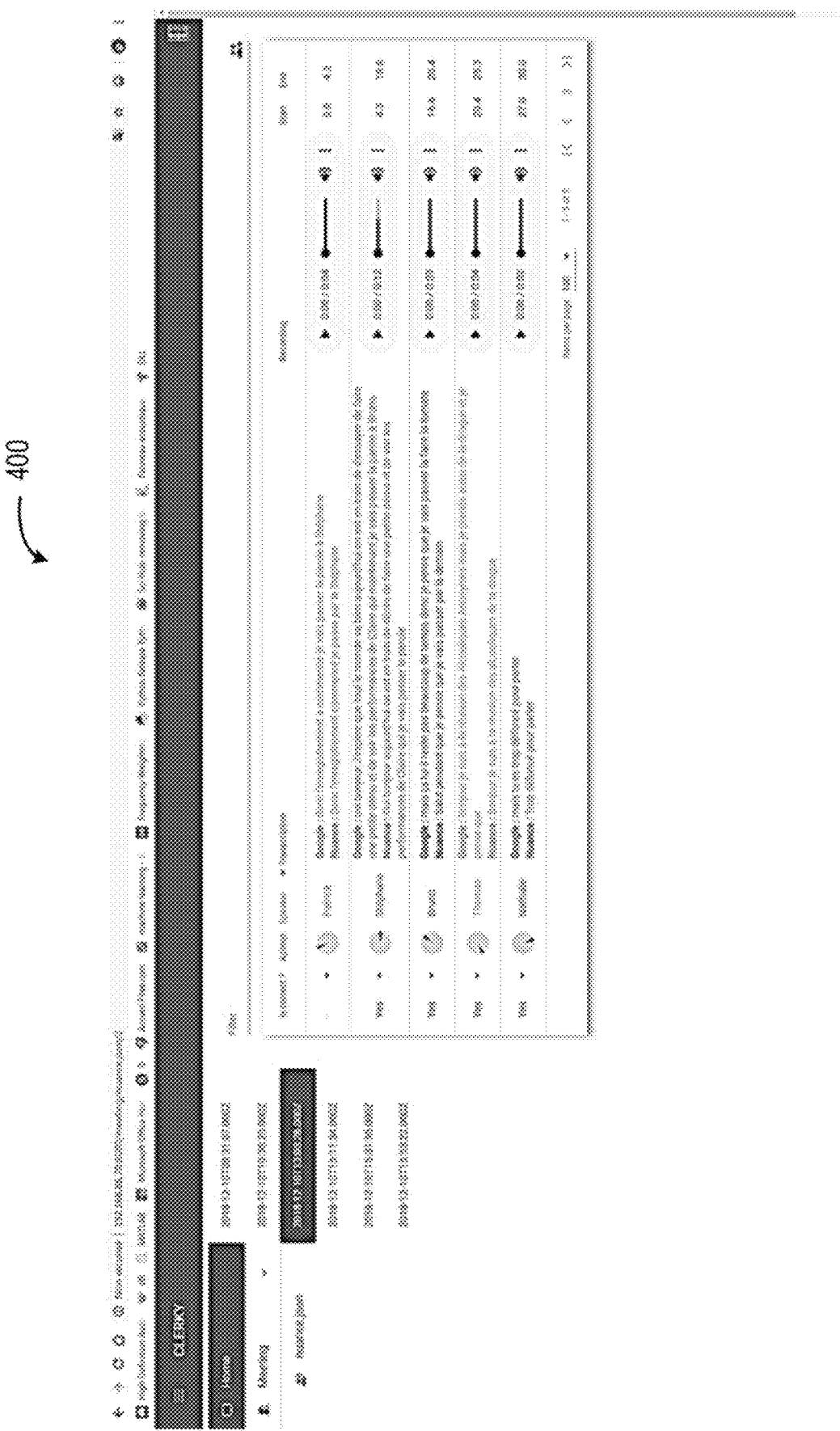
FIG. 4 depicts a diagram of a holistic graphical user interface including different types of transcriptions and elements to facilitate curated learning according to some embodiments.

In some embodiments, the voice identification and meeting analysis system 104 functions to generate holistic graphical user interfaces. In some embodiments, holistic graphical user interfaces may include transcriptions of a meeting shown in a timeline format and with segments of the transcription associated with the meeting participant 106 that was speaking during that segment. Example holistic interfaces that may be generated by the voice identification and meeting analysis system 104 are shown in FIGS. 3 and 4.

The communications network 108 may represent one or more computer networks (e.g., LAN, WAN, or the like) or other transmission mediums. The communication network 108 may provide communication between voice capturing system(s) 102 and voice identification and meeting analysis system 104 and/or other systems, engines, devices, networks and/or datastores described herein. In some embodiments, the communication network 108 includes one or more computing devices, routers, cables, buses, and/or other network topologies (e.g., mesh, and the like). In some embodiments, the communication network 108 may be wired and/or wireless. In various embodiments, the communication network 108 may include the Internet, one or more wide area networks (WANs) or local area networks (LANs), one or more networks that may be public, private, IP-based, non-IP based, and so forth.

Figure 2:
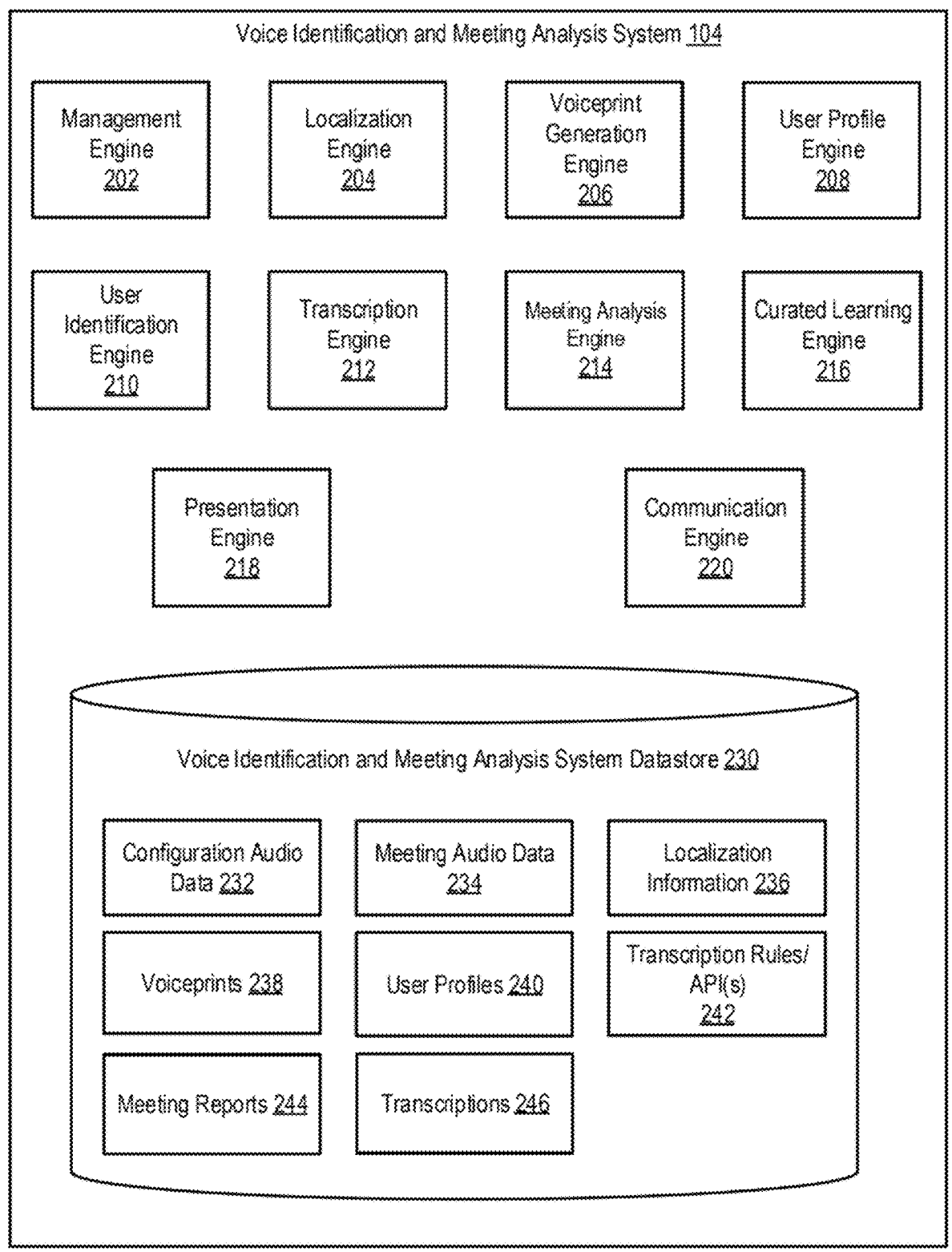
FIG. 2 depicts a diagram of an example of a voice identification and meeting analysis system according to some embodiments.

FIG. 2 depicts a diagram of an example of a voice identification and meeting analysis system 104 according to some embodiments. In the example of FIG. 2, the voice identification and meeting analysis system 104 includes a management engine 202, a localization engine 204, a voiceprint generation engine 206, a user profile engine 208, a user identification engine 210, a transcription engine 212, a meeting analysis engine 214, a curated learning engine 216, a presentation engine 218, a communication engine 220, and a voice identification and meeting analysis system datastore 230.

The management engine 202 may function to manage (e.g., create, read, update, delete, or otherwise access) configuration audio data 232, meeting audio data 234, localization information 236, voiceprints 238, user profiles 240, transcription rules 242, and/or meeting reports 244. Any of 232-244 may be stored in the voice identification and meeting analysis system datastore 230 and/or other datastore(s) associated with the voice identification and meeting analysis system 104. The management engine 202 may perform any of these operations manually (e.g., by a user interacting with a GUI) and/or automatically (e.g., triggered by one or more of the engines 204-220). Like other engines described herein, some or all of the functionality of the management engine 202 may be included in and/or cooperate with one or more other engines (e.g., engines 204-220).

The localization engine 204 may function to generate localization information 236. The localization information 236 may indicate respective locations for each of the meeting participants 106. For example, signal strength associated with each microphone of a voice capturing system 102 may be used to estimate a particular meeting participant's 106 location relative to the voice capturing system 102 and/or relative to other meeting participants 106. In some embodiments, the localization engine 204 may generate localization information using cross-correlation-based algorithms (e.g., SRP-PHAT, MULTI-PHAT, etc.). In some embodiments, a localization engine (e.g., localization engine 204) generates the localization information.

In some embodiments, the localization engine 204 functions to generate localization information 236 based on configuration audio data 232 to determine an initial location of meeting participants 106 at a meeting. The configuration audio data 232 may include voice information of the meeting participants 106 recorded during a configuration phase. The configuration phase may occur prior to the start of the meeting, and may include meeting participants verbally reciting one or more configuration phrases (e.g., "Hello, my name is <insert meeting participant name>" and/or "The cat jumps over the lazy dog"). Accordingly, the voice information may include audio data of one or more recited configuration phrases.

In some embodiments, the localization engine 204 functions to generate localization information 236 based on meeting audio data 234 to determine location of voices of meeting participants 106 during a meeting. The meeting audio data 234 may include voice information of the meeting participants 106 recorded during the meeting (e.g., after the configuration phase). The localization engine 204 may logically and/or physically divide the meeting audio data 234 (as well configuration audio data 232) into segments, and determine a location of a voice for each segment. A segment may be a portion of audio data that a particular meeting participant 106 is speaking. For example, if a meeting begins with a first meeting participant speaking for 10 seconds, followed by a second speaker for 30 seconds, then the first segment would be 10 seconds and the second segment would be 30 seconds.

In some embodiments, voice information may be captured by one or more microphones (e.g., directional microphones) of a plurality of microphones of a voice capturing system (e.g., one or more microphones 502 of a voice capturing system 102). As used herein, the term "directional" may refer to unidirectional or omnidirectional. In some embodiments, the voice identification and meeting analysis system receives the configuration audio data from one or more voice capturing systems over a network (e.g., communications network 108).

In some embodiments, the voice information may include voice audio data (e.g., configuration audio data 232 and/or meeting audio data 234) and associated signal strength data. For example, the voice audio data may include a recording of a meeting participant reciting "Hello, my name is Patrick" and the signal strength data may have values in a predetermined range (e.g., between 1 and 10) for each of the microphones of a voice capturing system 102 performing the recording. The signal strength values may be used to determine localization information 236 which may indicate a position and/or proximity of the meeting participant relative to the voice capturing system and/or one or more microphones of the voice capturing system. In one example, the localization engine 204 may use cross-correlation-based algorithms (e.g., SRP-PHAT, MULTI-PHAT, etc.) to determine localization information 236.

The voiceprint generation engine 206 functions to generate (e.g., create and/or update) voiceprints 238. The voiceprint generation engine 206 may generate voiceprints 238 based on the configuration audio data 232 and/or the localization information 236. A voiceprint 238 may comprise a "signature" of a voice that may be used to identify a voice in audio data. A voiceprint 238 may comprise various voice audio parameters, such pitch, tenor, treble, volume, and/or the like.

In some embodiments, the voiceprint generation engine 206 generates voiceprints 238 separately from a meeting (e.g., without using configuration audio data 232). For example, the voiceprint generation engine 206 may create a voiceprint for a user during user registration. This may allow, for example, a more complete or mature voiceprint to be generated (e.g., depending on an amount of time and/or configuration phrases that a user provides during registration). For example, it may be impractical for a user to provide enough voice information during the configuration phase of a meeting to generate a mature voiceprint. However, the user may be able to provide more information during registration that may result in a mature voiceprint being created during registration.

In some embodiments, the voiceprint generation engine 206 may function to determine whether a voiceprint needs to be created for a meeting participant or whether an acceptable voiceprint 238 already exists. The voiceprint generation engine 206 may search the voiceprints 238 based on the localization information 236 and/or configuration audio data 232 as search criteria. For example, a meeting participant Patrick may have recited a configuration phrase (e.g., "Hello, my name is Patrick" or "The cat jumps over the lazy dog") during a configuration phase of a meeting. The voice identification and meeting analysis system may use characteristics of the recited configuration phrase as search parameters to determine whether there are any matching voiceprints 238. The characteristics may be voiceprint characteristics (e.g., pitch, tenor, treble, volume, etc.) and/or may be the content of the configuration phrase. For example, if the configuration phrase matches any known terms (e.g., a name, a location, etc.) those may be searched as well. If there is a match, then the voiceprint 238 may be retrieved. Otherwise, the voiceprint generation engine 206 may create a new voiceprint 238.

In some embodiments, the meeting participant may be queried to confirm that a matched voiceprint 238 is correct. For example, the voiceprint generation engine 238 may provide a message (e.g., an electronic message, and audio) indicating the name associated with the voiceprint 238 and request that the user confirm. If the user confirms the voiceprint is 238 is their voiceprint, then that voiceprint may be used by the voice identification and meeting analysis system to identify that meeting participant. Otherwise, the voiceprint generation engine 206 may require that a new voiceprint 238 be created.

In some embodiments, the voiceprint generation engine 206 may determine and/or assign a maturity level to a voiceprint 238. For example, when the voiceprint generation engine 206 initially creates a voiceprint 238 (e.g., during the configuration phase), the voiceprint 238 may have a relatively low, or even the lowest, maturity level. As more audio data of the corresponding meeting participant is obtained, as well as user feedback, the voiceprints 238 may be updated and the maturity level increased. The maturity level may indicate a relative accuracy that may be obtained when attempting to identify a voice using the corresponding voiceprint 238.

The user profile engine 208 may function to user profiles 240. The user profile engine 208 may generate user profiles 240 automatically and/or manually. For example, a user may register and create a user profile 240. In some embodiments, the user profile engine 240 may create a user profile 240 automatically during the configuration phase. For example, if a user does not already have a user profile 240, the user profile engine 208 may automatically create a user profile 240 in response to obtaining a recording of a configuration phrase recited by the user. For example, a user may recite "My name is John Doe." The user profile engine 208 may create a user profile 240 for John Doe.

In some embodiments, user profiles 240 may include some or all of the following information:
 Profile Identifier: a unique identifier of the user profile.
 Name: Full name (e.g., John Doe). The full name and/or a portion thereof (e.g., John) may be used to attribute the user to one or more segments of a meeting in an holistic graphical user interface.
 Voiceprint
 Voiceprint maturity level
 Linked Meeting: meetings identifiers and/or corresponding meeting audio data 232 that indicate the user as a meeting participant.
 Profile picture The user identification engine 210 may function to identify participants of a meeting. More specifically, the user identification engine 210 may function to identify voices of meeting participants within meeting audio data 234 of a meeting. Accordingly, the user identification engine 210 may obtain meeting audio data 234. The meeting audio data may include voice information (or, data) for the meeting participants recorded during a substantive phase of the meeting (e.g., not including the configuration phase). The voice information may be captured by a voice capturing system 102.

In some embodiments, the user identification engine 210 analyzes the meeting audio data 234 to identify, based on the localization information 236 and/or the voiceprints 238, one or more of the meeting participants. In some embodiments, the user identification engine 210 determines respective maturity levels of voiceprints 238 of the meeting participants. If a particular voiceprint 238 does not satisfy a particular maturity threshold, then the user identification engine 210 may require both localization information 236 and voiceprints 238 when identifying meeting participants. If a particular voiceprint 238 satisfies the particular maturity threshold, then the user identification engine 210 may identify meeting participants using the voiceprint 238 without using localization information 236.

In some embodiments, the user identification engine 210 identifies meeting participants based only on location information 236. For example, if there relatively few meeting participants in a meeting (e.g., two meeting participants located at opposite ends of a table), or where each meeting participant is at different geographic locations and is being recorded by different voice capturing systems 102 (e.g., as part of a distributed system as described in FIG. 6), it may be more accurate to rely only on the location information 236.

In some embodiments, the user identification engine 210 identifies meeting participants based only on the voiceprints 238. For example, if the voiceprints are mature (e.g., satisfying a particular threshold) and/or if the meeting participants are likely to move around (e.g., as opposed to likely remaining stationary), it may be more accurate to rely only on the voiceprints 238.

In some embodiments, the user identification engine 210 may determine weighted values for the localization information 236 (e.g., weighted localization values) and/or weighted values for the voiceprints 238 (e.g., weighted voiceprint values) when identifying meeting participants. For example, if a voiceprint 238 has a relatively low maturity (e.g., between 1-3 on a scale of 1-10, with 1 being the lowest, and 10 being the highest), the voiceprint 238 may be weighted less than the localization information 236 when determining meeting participant identity. Conversely, if a voiceprint 238 has a relatively high maturity (e.g., between 7-10 on a scale of 1-10, with 1 being the lowest, and 10 being the highest), the voiceprint 238 may be weighted more than the localization information 236 when determining meeting participant identity. In some embodiments, the weighting may shift as voiceprint 238 maturity levels increase and/or decrease. For example, in an initial determination when a voiceprint 238 has just been created (e.g., having a maturity level of 1), the determination may be based 90% on the localization information 236, and 10% on the voiceprint 238. As the maturity level increases, the percentage may shift. For example, at maturity level 2, it may be 80% localization information 236 and 20% voiceprint 238; at maturity level 3, it may be 70% localization information 236 and 30% voiceprint 238; and so forth.

The transcription engine 212 may function to generate one or more transcriptions (e.g., transcriptions 246) of the meeting audio data. In some embodiments, the transcription engine 212 generates one or more transcriptions (e.g., a NUANCE transcription, a GOOGLE transcription, transcriptions in different languages, and/or the like) for each of the segments of the meeting audio data. As used herein, "segments" may refer to a segment of a transcription, and/or a segment of audio data (e.g., configuration audio data 232 and/or meeting audio data 234). Segment may be delineated by speakers. For example, a segment may being when a new or different meeting participant speaks, and a segment may end when a meeting participant stops speaking and/or new or different meeting participant speaks.

In some embodiments, the transcription engine 212 may transcribe meeting audio data 234 after meeting participants are identified. This may allow the meeting audio data to be transcribed on a segment by segment basis. For example, a first meeting participant (e.g., Patrick) may be associated with a first, third and fifteenth segment of the meeting audio data; and a second meeting participant (e.g., Corinne) may be associated with a second, fourth, and thirteenth segment of the meeting audio data. The voice identification and meeting analysis system may be able to use the voiceprint of the identified meeting participants to enhance transcription accuracy. For example, a transcription service could be configured based on the voiceprint of Patrick when transcribing the first, third and fifteenth segment of the meeting audio data, and the transcription service can be configured based on the voiceprint of Corinne when transcribing the second, fourth, and thirteenth segment of the meeting audio data. Performing transcriptions on a segment by segment basis may also facilitate parallelization of the transcription process.

In some embodiments, the voice identification and meeting analysis system may transcribe (e.g., convert speech to text) the meeting audio data either before or after meeting participants are identified. For example, if it is transcribed before meeting participants are identified, then a generic place holder (e.g., speaker 1, speaker 2, etc.) may be associated with the different segments of speech, and then once the meeting participants are identified, the generic placeholder can be replaced with the identified meeting participants (or, their respective meeting participant identifiers).

The meeting analysis engine 214 may function to generate meeting reports 244. Meeting reports 244 may includes all data and information associated with one or more meetings. For example, a meeting report 244 may include configuration audio data 232, meeting audio data 234, localization engine 236, voiceprints 238, transcriptions 246, and/or the like. The meeting reports 244 may include transcription segments and/or audio segments (e.g., audio clips). The meeting reports 244 may store links between meeting participants and segments. The meeting reports 244 may include user information from user profiles 240 of the meeting participants (e.g., profile pictures). The meetings reports 244 may include all of the data, structures, and relationships needed to generate holistic graphical user interfaces (e.g., holistic graphical user interface 300 and 400).

The meeting analysis engine 214 may function to search meeting reports 244. For example, meeting reports 244 may be searched based on meeting participant identifiers, names, voiceprints, text (e.g., of transcription text), audio (e.g., of configuration audio data 232 or meeting audio data 234). Searches may be performed in response to user input and/or automatically.

In some embodiments, the meeting analysis engine 214 functions to link meeting participant identifiers (e.g., meeting participant identifiers stored in user profile 240) of the identified meeting participants to corresponding segments. For example, the meeting analysis engine 214 system may link meeting participant identifiers with the one or more transcription segments and/or audio segments. In some embodiments, the meeting analysis engine 214 may automatically segment audio data and/or transcripts to generate segments (e.g., audio segments, transcript segments).

The curated learning engine 216 may function to update and/or improve voiceprints 238. Improved voiceprints 238 may have a relatively higher maturity level (e.g., on a scale of 1-10). In some embodiments, the curated learning engine 216 receives user feedback associated with the linking of meeting participant identifiers with segments (e.g., of meeting audio data 234 and/or of transcriptions 246). For example, the user feedback may indicate that a meeting participant was incorrectly linked to a segment. The user feedback be received through an holistic graphical user interface (e.g., holistic graphical user interface 400). In some embodiments, the curated learning engine 216 may unlink, based on the user feedback, meeting participant identifiers of meeting participants from the segments.

In some embodiments, the curated learning engine 216 updates, based on the unlinking and/or the user feedback, one or more voiceprints of meeting participants. For example, the curated learning engine 216 may update voiceprints by removing the unlinked segment from a set of data used to determine a meeting participant's voiceprint, and/or add the unlinked segment to a set of data used to determine a meeting participants voiceprint.

In some embodiments, the curated learning engine 216 may update data for a currently analyzed meeting and/or historical meetings. For example, the curated learning engine 216 may update one or more meetings reports 244 and/or holistic GUIs (e.g., holistic graphical user interface 300 or holistic graphical user interface 400) and/or other data. For example, the updates may include updating historical meeting reports 244 which include the voiceprint 238 that has been updated. Historical data may be re-processed using the updated voiceprints 238 and/or otherwise incorporating the user feedback. For example, historical transcriptions 246 may be entirely and/or partially re-generated using the updated voiceprint 238. Accordingly, elements of the holistic graphical user interfaces may also be updated (e.g., graphical associations between segments and meeting participants, locations of meeting participants, time representations, and/or the like.

The presentation engine 218 may function to present and/or display one or more dashboards and/or graphical user interfaces (e.g., holistic graphical user interfaces). For example, a dashboard may allow particular types of user (e.g., an administrator, a meeting coordinator, meeting participants) to view holistic graphical user interface representations of meeting reports 244, receive and provides user feedback for curated learning, and/or provide graphical user interfaces for other features described herein. The presentation engine 218 may render graphical user interfaces and/or cooperate with one or more other systems (e.g., a web browser or application of a client system) to render the graphical user interfaces.

In some embodiments, the presentation engine 218 generates a holistic graphical user interface (GUI) (e.g., holistic graphical user interface 300) indicating the respective locations of the meeting participants. The holistic GUI may also indicate transcriptions of the segments of the meeting audio data. For example, a transcription of the first segment of the meeting audio data may be associated with Patrick and transcriptions of a third and fifth segment of the meeting audio data may be associated with Corinne.

In some embodiments, the presentation engine 218 presents the holistic graphical user interface. In some embodiments, a presentation engine (e.g., presentation engine 218) format the meeting report for presentation (e.g., rendering and/or display) in a holistic graphical user interface (e.g., as shown in FIG. 3) and/or for presentation in hardcopy format (e.g., for printing). The presentation may occur on a system remote from the voice identification and meeting analysis system (e.g., a web browser or mobile application of a client device).

In some embodiments, the presentation engine 218 generates the holistic graphical user interface based on one or more meetings reports. For example, the meeting report may include identifiers of meeting participants (e.g., name, picture and/or other user profile information), locations of meeting participants, a graphical representation of the location of meeting participants, a timeline representation of the transcribed segments, audio clips of the segments, and/or the like. The presentation engine may render the report in a graphical user interface format.

The communication engine 220 may function to send requests, transmit and, receive communications, and/or otherwise provide communication with one or a plurality of the systems, engines, devices and/or datastores described herein. In some embodiments, the communication engine 220 functions to encrypt and decrypt communications. The communication engine 220 may function to send requests to and receive data from one or more systems through a network or a portion of a network (e.g., communications network 108, communications network 608). Depending upon implementation-specific considerations, the communication engine 220 may send requests and receive data through a connection, all or a portion of which may be a wireless connection. The communication engine 220 may request and receive messages, and/or other communications from associated systems and/or engines. Communications may be stored in the voice identification and meeting analysis system datastore 230.

FIG. 3 depicts an example of a holistic graphical user interface 300 including a speech timeline 302 and locations of meeting participants according to some embodiments. As shown, there are meeting participants Patrick, Thomas, Corinne and Samir. Thomas and Samir are shown in a first location 304 (e.g., a "left side"), and Patrick and Corinne are shown in a second location 306 (e.g., a "right side"). A voice capturing system 102 may have captured the meeting audio data 234 of the meeting, and a voice identification and meeting analysis system 104 may have segmented the meeting audio data 234 based on different speakers (e.g., a new segment begins when a new meeting participant speaks, and a segment ends when that meeting participant stops speaking and/or a new speaker begins speaking).

The speech timeline 302 of the holistic graphical user interface 300 provides transcription segments 308-316 in chronological order. Transcription segments 308-316 are also associated with profile pictures of the speaking meeting participants. The transcription segments 308-316 also include different transcriptions for each segment (e.g., a NUANCE transcription and a GOOGLE transcription). The transcription segments 308-316 additionally include audio clips of that segment from the meeting audio data 234 that can be played back within the holistic graphical user interface 300. The transcription segments 308-316 also include start and stop timestamps for the segment (e.g., corresponding to a portion of the playback timing of the meeting audio data 234).

FIG. 4 depicts an example of a holistic graphical user interface 400 including different types of transcriptions and elements to facilitate curated learning according to some embodiments. As shown, the holistic graphical user interface includes meeting participants associated with transcription segments in which they are the speaker. For example, one of the transcription segments is associated with Patrick, another transcription segment is associated with Stephane, and so forth. Each transcription segment has multiple transcriptions of the segment (e.g., a NUANCE transcription and a GOOGLE transcription). Each transcription segment also includes an audio clip of the segment that may be played back within the holistic graphical user interface 400. Each transcription segment also includes start and stop timestamps for the segment (e.g., corresponding to a portion of the playback timing of the meeting audio data 234).

The holistic graphical user interface 400 further includes graphical element to facilitate curated learning for improving voiceprints and meeting participant identification. As shown, the holistic graphical user interface 400 includes a field for each segment that a user can indicate whether the correct meeting participants has been indicated as the speaker for that segment. For example, if a user selects "No," that user feedback may be provided to curated learning engine 216 and the curated learning engine 216 can update one or more voiceprints and/or links. For example, if a user provides feedback that Patrick was incorrectly linked to that segment, the curated learning engine 216 can remove the link, and the user may indicate the appropriate meeting participant (e.g., Thomas). The curated learning engine 216 may then update the voiceprints 238 of Patrick and/or Thomas accordingly.

The holistic graphical user interface 400 includes an azimuthal direction indicator indicating a location or position of the meeting participant (e.g., at a meeting table) relative to a location or position of the voice capturing system 102.

In various embodiments, the graphical user interfaces described herein (e.g., holistic graphical user interfaces 300 and 400) may share features. For example, the holistic graphical user interface 300 may also include some or all of the features of the holistic graphical user interface 400. In another example, the holistic graphical user interface 400 may include some or all of the features of the holistic graphical user interface 300. Accordingly, a holistic graphical user interface may include some or all of the features of holistic graphical user interface 300 and some or all of the features of holistic graphical user interface 400.

Figure 5:
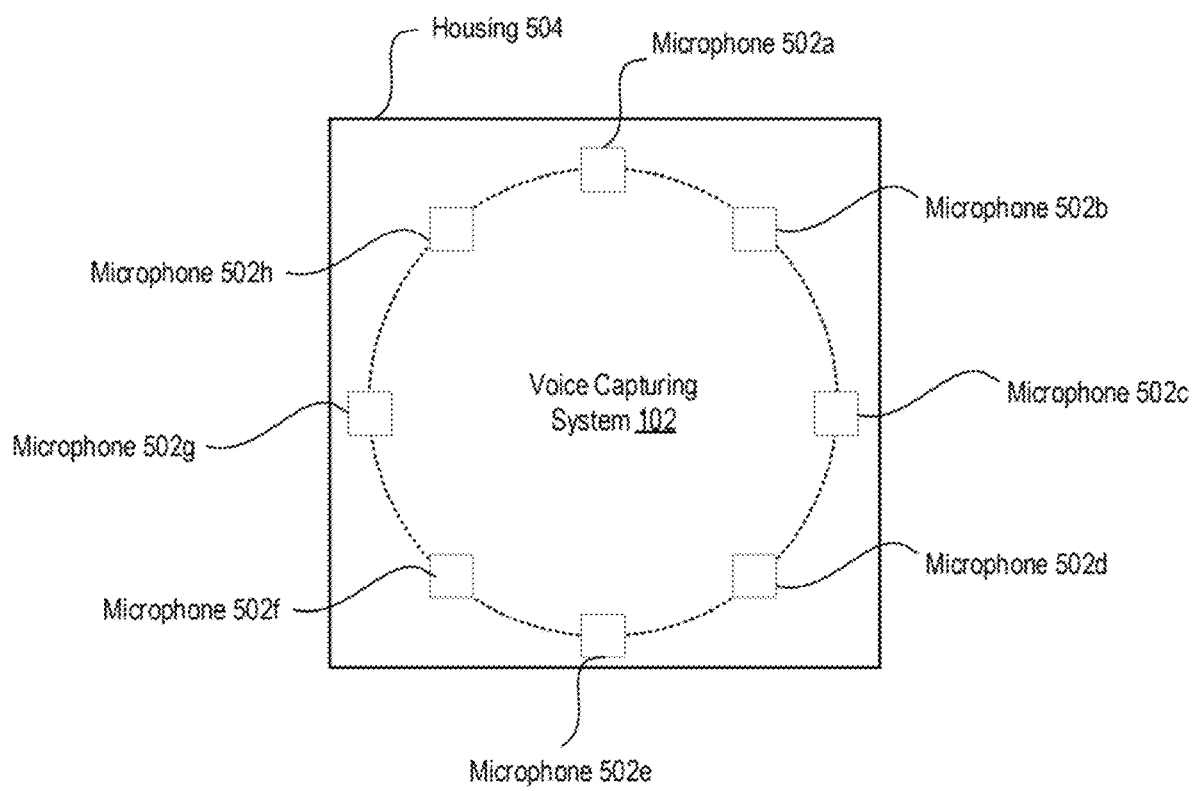
FIG. 5 depicts a diagram of an example of a voice capturing system according to some embodiments.

FIG. 5 depicts a diagram of an example of a voice capturing system 102 according to some embodiments. As shown, the voice capturing system 102 may include an array of microphones 502a-h disposed within a housing 504. In this embodiments, the voice capturing system 102 includes eight microphones 502 placed in a circular array comprising two squares with four microphones on each point at a 45-degree rotation that are used to enable beam forming, speech source direction and accurate voice recording. Although eight microphones 502 are shown here, other embodiments may user a greater or lesser number of such microphones 502 (e.g., 3 microphones). The microphones 502 may be directional and/or omnidirectional microphones. Each of the microphones 502 may capture signal strength.

Figure 6:
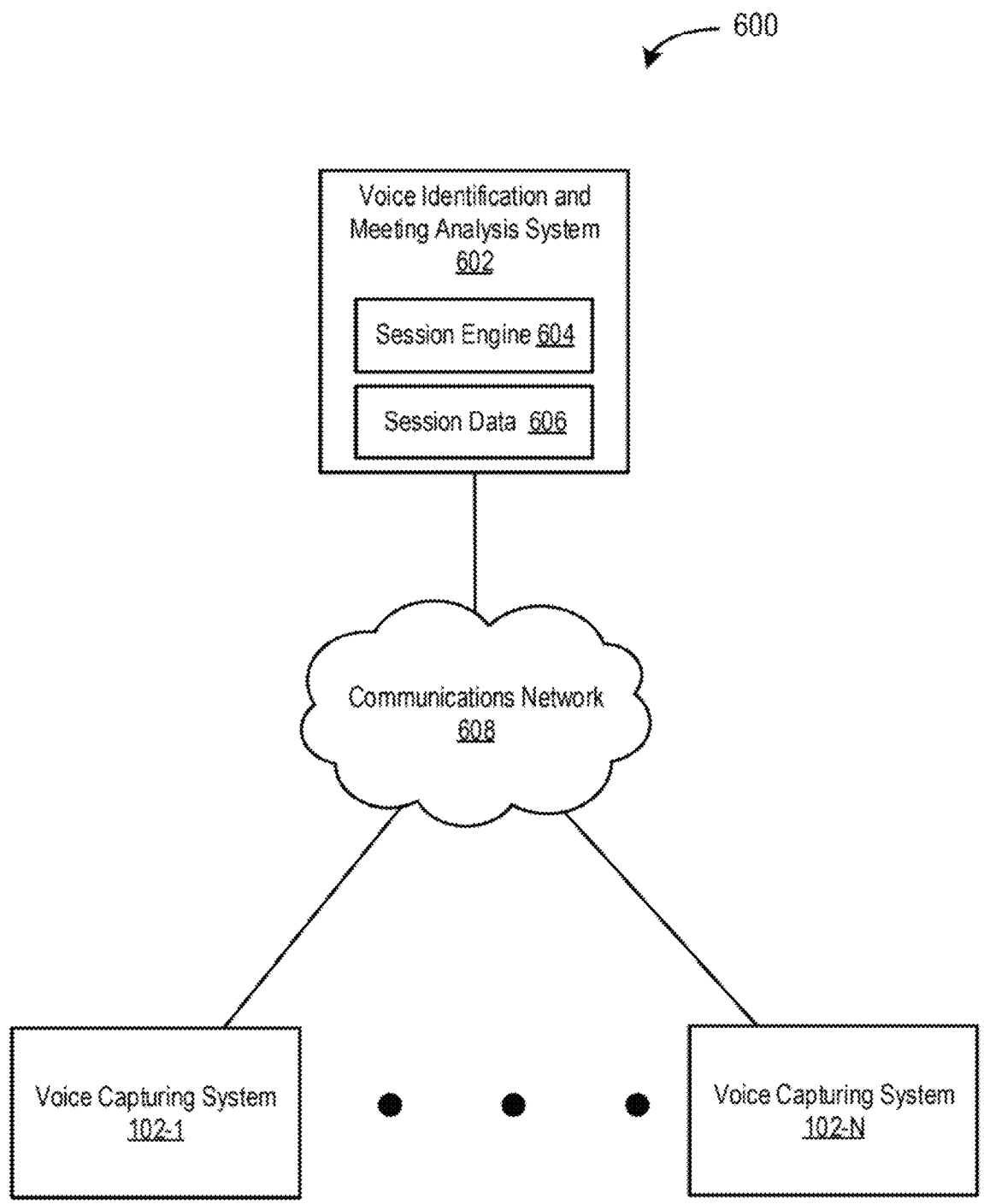
FIG. 6 depicts a diagram of an example system for identifying voices and participants of a distributed meeting, transcribing speech of those voices, and generating corresponding holistic graphical user interfaces according to some embodiments.

FIG. 6 depicts a diagram of an example system 600 for identifying voices and participants of a distributed meeting, transcribing speech of those voices, and generating corresponding holistic graphical user interfaces according to some embodiments. In the example of FIG. 6, the system 600 includes voice capturing systems 102-1 to 102-N (individually, the voice capturing system 102, collectively, the voice capturing systems 102), a voice identification and meeting analysis system 602, and a communications network 608.

The voice identification and meeting analysis system 602 may include some or all of the functionality of the voice identification and meeting analysis system 104. The voice identification and meeting analysis system 602 also includes functionality to function as a central server in a distributed computing environment. For example, the voice capturing systems 102 may be clients of the voice identification and meeting analysis system 602.

The voice identification and meeting analysis system 602 may function to manage meetings having meeting participants in different locations and/or enterprises. For example, a single meeting may involve meeting participants from multiple offices and/or multiple enterprises. Accordingly, the voice identification and meeting analysis system 602 may manage (e.g., perform some or all of a voice identification and meeting analysis system 102) a meeting involving meeting participants meeting participants from multiple offices and/or multiple enterprises.

The session engine 604 may generate and store session data 606 to manage distributed meetings. For example, a distributed meeting may include a first voice capturing system 102-1 deployed in a Boston office of Acme Corporation, a second voice capturing system 102-2 deployed in a San Francisco office of Acme Corporation, and third voice capturing system 102-3 deployed in a New York office of Widget Company. The session engine 604 may generate unique session identifier for the meeting and/or each voice capturing system 102. For example, a session identifier may include an identifier of the meeting (e.g., 1234) and an identifier of the voice capturing system (e.g., A, B, C, D). Accordingly, a session identifier for a meeting participants of a meeting at voice capturing system 102-1 may be 1234-A, a session identifier for meeting participants of the meeting at voice capturing system 102-2 may be 1234-B, and so forth. The session engine 604 may link, segment, and/or aggregate the meeting information (e.g., configuration audio data, meeting audio data, etc.) using the session identifiers.

In some embodiments, the voice identification and meeting analysis system 604 may function to improve the accuracy of identifying meeting participants. When identifying meeting participants in meeting audio data, the voice identification and meeting analysis system 602 may only match voiceprints against meeting participants associated with a particular voice capturing system 102 (e.g., during a configuration phase). For example, during a configuration phase, Patrick may recite a configuration phase recorded by the voice capturing system 102-1. When identifying meeting participants, the voice identification and meeting analysis system 602 may limit the set of meeting participants that may be matched based on the session identifier of voice capturing system. Accordingly, Patrick may only be matched against segments recorded by the voice capturing system 102-1, and Patrick may not be matched against segments recorded by other voice capturing systems of the distributed voice capturing system systems.

Figure 7:
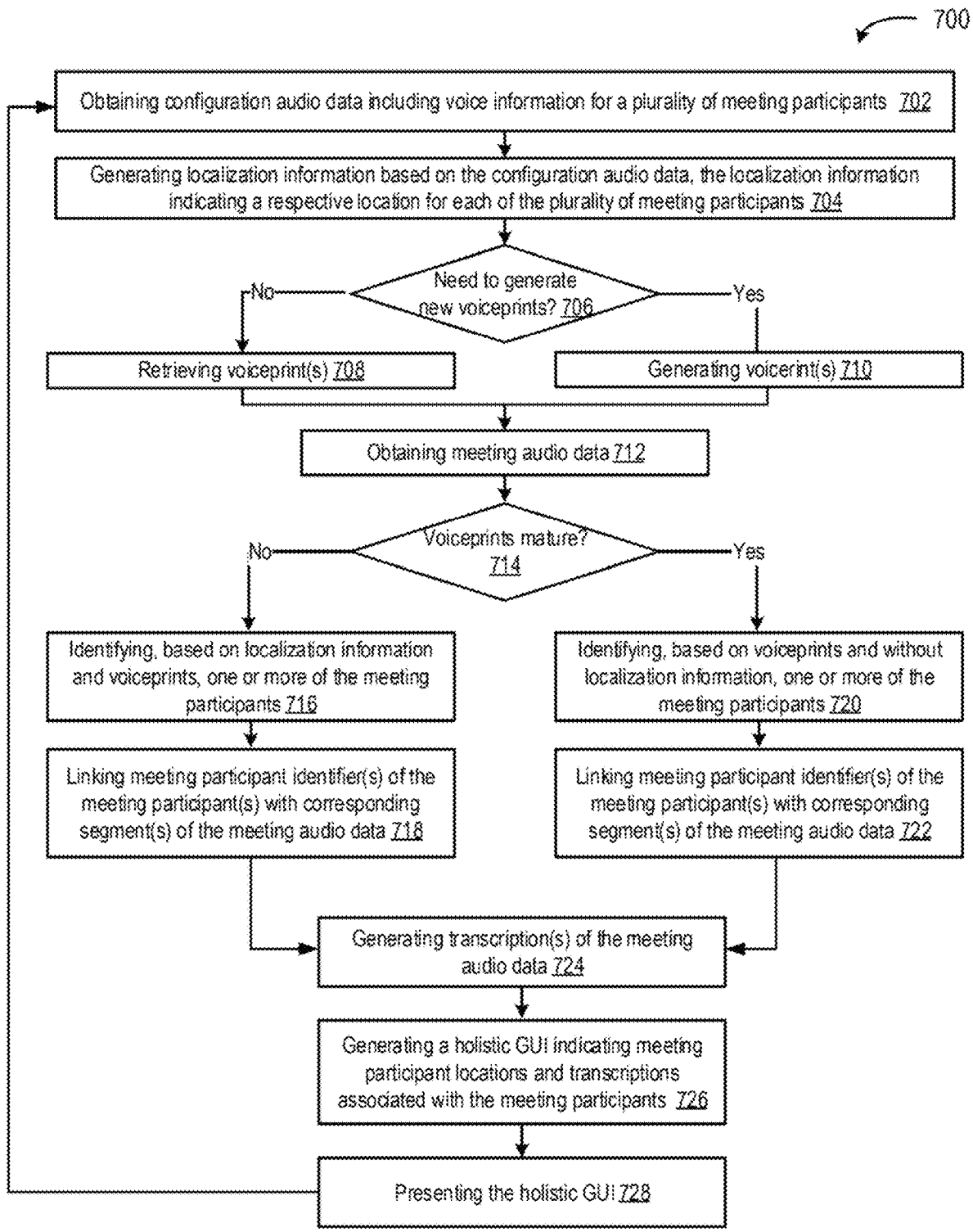
FIG. 7 depicts a flowchart of an example of a method of identifying voices of meeting participants and generating a corresponding holistic graphical user interface according to some embodiments.

FIG. 7 depicts a flowchart of an example of a method 700 of identifying voices of meeting participants and generating a corresponding holistic graphical user interface according to some embodiments. In this and other flowcharts and/or sequence diagrams, the flowchart illustrates by way of example a sequence of steps. It should be understood the steps may be reorganized for parallel execution, or reordered, as applicable. Moreover, some steps that could have been included may have been removed to avoid providing too much information for the sake of clarity and some steps that were included could be removed, but may have been included for the sake of illustrative clarity.

In step 702, a voice identification and meeting analysis system (e.g., voice identification and meeting analysis system 104) obtains configuration audio data (e.g., configuration audio data 232). The configuration audio data may include voice information for a plurality of meeting participants (e.g., meeting participants 106) recorded during a configuration phase (e.g., steps 702-706). The configuration phase may occur prior to the start of a meeting, and may include meeting participants verbally reciting one or more configuration phrases (e.g., "Hello, my name is <insert meeting participant name>" and/or "The cat jumps over the lazy dog"). Accordingly, the voice information may include audio data of one or more recited configuration phrases.

The voice information may be captured by one or more microphones (e.g., directional microphones) of a plurality of microphones of a voice capturing system (e.g., one or more microphones 502 of a voice capturing system 102). As used herein, the term "directional" may refer to unidirectional or omnidirectional. In some embodiments, the voice identification and meeting analysis system receives the configuration audio data from one or more voice capturing systems over a network (e.g., communications network 108).

In some embodiments, the voice information may include voice audio data and associated signal strength data. For example, the voice audio data may include a recording of a meeting participant reciting "Hello, my name is Patrick" and the signal strength data may indicate a position and/or proximity of the meeting participant relative to the voice capturing system and/or one or more microphones of the voice capturing system.

In step 704, the voice identification and meeting analysis system generates localization information (e.g., localization information 236) based on the configuration audio data. The localization information may indicate a respective location for each of the meeting participants. For example, triangulation may be used to estimate meeting participant location relative to the voice capturing system (or one or more microphones thereof) and/or relative to other meeting participants. In another example, the voice identification and meeting analysis system may generate localization information using cross-correlation-based algorithms (e.g., SRP-PHAT, MULTI-PHAT, etc.). In some embodiments, a localization engine (e.g., localization engine 204) generates the localization information.

In step 706, the voice identification and meeting analysis system determines whether a voiceprint needs to be created for one or more of the meeting participants. More specifically, the voice identification and meeting analysis system may search a set of voiceprints (e.g., voiceprints 238) stored in a datastore (e.g., voice identification and meeting analysis system datastore 230) based on the localization information and/or configuration audio data as search criteria. For example, meeting participant Patrick may have recited a configuration phrase (e.g., "Hello, my name is Patrick" or "The cat jumps over the lazy dog") during a configuration phase of a meeting. The voice identification and meeting analysis system may use characteristics of the recited configuration phrase as search parameters to determine whether there are any matching voiceprints. The characteristics may be voiceprint characteristics (e.g., pitch, tenor, treble, volume, etc.) and/or may be content of the configuration phrase. For example, if the configuration phrase matches any known terms (e.g., a name, a location, etc.) those may be searched as well.

Voiceprints may be stored in user profiles (e.g., user profiles 240) of registered meeting participants. In some embodiments, a voiceprint generation engine (e.g., voiceprint generation engine 206) determines whether a voiceprint needs to be created for one or more of the meeting participants.

Whether a matching voiceprint exists may be determined for each of the meeting participants. If there is a match between a meeting participant's configuration phrase and a stored voiceprint, then that voiceprint is retrieved and associated with that meeting participant for the meeting (step 708). If there is no match between a meeting participant's configuration phrase and a stored voiceprint, then a voiceprint is generated (step 710).

More specifically, in step 710, the voice identification and meeting analysis system generates, based on the configuration audio data and the localization information, a respective voiceprint (e.g., voiceprint 238) for each meeting participant that does not already have a voiceprint (e.g., as determined by searching the stored voiceprints in the user profiles). In some embodiments, a voiceprint generation engine (e.g., voiceprint generation engine 206) generates the voiceprints.

In some embodiments, voiceprints may be generated separately from a meeting. For example, a user may create a voiceprint when registering a user profile. This may allow, for example, a more complete or mature voiceprint to be generated (e.g., depending on an amount of time and/or configuration phrases that a user provides). For example, it may be impractical for a user to provide enough voice information during the configuration phase of a meeting to generate a mature voiceprint. However, the user may be able to provide more information during registration.

In step 712, the voice identification and meeting analysis system obtains meeting audio data (e.g., meeting audio data 234). The meeting audio data may include voice information (or, data) for the plurality of meeting participants recorded during a substantive phase of meeting (e.g., not including the configuration phase). For example, the substantive phase of the meeting will be transcribed, analyzed, used to generate meeting reports and so forth. The voice information may be captured by one or more microphones of a plurality of microphones (e.g., one or more microphones 502 of a voice capturing system 102). In some embodiments, the voice identification and meeting analysis system receives the meeting audio data from a voice capturing system over a network.

In step 714, the voice identification and meeting analysis system determines, for each of the voiceprints (e.g., either retrieved in step 708 or generated in step 710), whether the voiceprints are mature. If a particular voiceprint is not mature, then the method may proceed to step 716 for that particular voiceprint. If a particular voiceprint is mature, then the method may proceed to step 720 for that particular voiceprint.

In step 716, the voice identification and meeting analysis system analyzes the meeting audio data to identify, based on the localization information and the voiceprints, one or more of the meeting participants (e.g., Patrick). Since the voiceprints for these meeting participants are not yet mature, both the localization information and voiceprints are used to identify the meeting participants in the meeting audio data and the segment(s) of the meeting audio data in which they are speaking. In some embodiments, a user identification engine (e.g., user identification engine 210) performs the identification.

In step 718, the voice identification and meeting analysis system links meeting participant identifier(s) (e.g., meeting participant identifier(s) of user profile(s) 240) of the one or more meeting participants (e.g., Patrick) that do not have mature voiceprints to the one or more corresponding segments of the meeting audio data in which they are speaking. For example, the voice identification and meeting analysis system may link a first meeting participant identifier of Patrick, who does not have a mature voiceprint, with a first, third and fifteenth segment of the meeting audio data (e.g., the segments the voice identification and meeting analysis system has determined that Patrick is speaking). In some embodiments, a meeting analysis engine (e.g., meeting analysis engine 214) performs the linking.

In step 720, the voice identification and meeting analysis system analyzes the meeting audio data to identify, based on the voiceprints and without using localization information, one or more of the meeting participants (e.g., Corinne). Since the voiceprints for these meeting participants are mature, localization information is not needed to identify the meeting participants in the meeting audio data and the segment(s) of the meeting audio data in which they are speaking. In some embodiments, the user identification engine (e.g., user identification engine 210) performs the identification.

In step 722, the voice identification and meeting analysis system links meeting participant identifier(s) (e.g., meeting participant identifier(s) of user profile(s) 240) of the one or more meeting participants (e.g., Corinne) that have mature voiceprints to the one or more corresponding segments of the meeting audio data in which they are speaking. For example, the voice identification and meeting analysis system may link a second meeting participant identifier of Corinne, who has a mature voiceprint, with a second, fourth, and thirteenth segment of the meeting audio data (e.g., the segments the voice identification and meeting analysis system has determined that Corinne is speaking). In some embodiments, the meeting analysis engine performs the linking.

In step 724, the voice identification and meeting analysis system generates one or more transcriptions (e.g., transcriptions 246) of the meeting audio data. In some embodiments, a transcription engine (e.g., transcription engine 212) generates one or more transcriptions (e.g., a NUANCE transcription, a GOOGLE transcription, transcriptions in different languages, and/or the like) for each of the segments of the meeting audio data.

In some embodiments, the voice identification and meeting analysis system may transcribe the meeting audio data after meeting participants are identified. This may allow the meeting audio data to be transcribed on a segment by segment basis. For example, a first meeting participant (e.g., Patrick) may be associated with a first, third and fifteenth segment of the meeting audio data; and a second meeting participant (e.g., Corinne) may be associated with a second, fourth, and thirteenth segment of the meeting audio data. The voice identification and meeting analysis system may be able to use the voiceprint of the identified meeting participants to enhance transcription accuracy. For example, a transcription service could be configured based on the voiceprint of Patrick when transcribing the first, third and fifteenth segment of the meeting audio data, and the transcription service can be configured based on the voiceprint of Corinne when transcribing the second, fourth, and thirteenth segment of the meeting audio data. Performing transcriptions on a segment by segment basis may also facilitate parallelization of the transcription process.

In some embodiments, the voice identification and meeting analysis system may transcribe (e.g., convert speech to text) the meeting audio data either before or after meeting participants are identified. For example, if it is transcribed before meeting participants are identified, then a generic place holder (e.g., speaker 1, speaker 2, etc.) may be associated with the different segments of speech, and then once the meeting participants are identified, the generic placeholder can be replaced with the identified meeting participants (or, their respective meeting participant identifiers).

In some embodiments, the voice identification and meeting analysis system links meeting participant identifiers with the one or more transcriptions instead of, or in addition to, linking meeting participant identifiers to segments of the meeting audio data (e.g., as shown in step 718). As used herein, "linking" a meeting participant identifier with meeting audio data (e.g., meeting audio data 234), or portion(s) thereof (e.g., "segments"), may refer to linking the meeting participant identifier to at least a portion of audio data (e.g., an audio clip) and/or one or more transcriptions of meeting audio data.

In step 726, the voice identification and meeting analysis system generates a holistic graphical user interface (GUI) (e.g., holistic graphical user interface 300) indicating the respective locations of the meeting participants. The holistic GUI may also indicate transcriptions of the segments of the meeting audio data. For example, a transcription of the first segment of the meeting audio data may be associated with Patrick and transcriptions of a third and fifth segment of the meeting audio data may be associated with Corinne.

In some embodiments, the voice identification and meeting analysis system generates the holistic graphical user interface based on one or more meetings reports (e.g., meeting reports 244). The meeting analysis engine may generate a meeting report including, for example, links between meeting participant identifiers and segments and/or transcriptions of meeting audio data and/or configuration audio data, configuration audio data files, meeting audio data files (e.g., audio clips of segments), timestamps of events (e.g., start and stop times for segments), the meeting participants of the meeting and their respective locations in the meeting, a timeline representation of the segments, and/or the like.

In step 728, the voice identification and meeting analysis system presents the holistic graphical user interface. In some embodiments, a presentation engine (e.g., presentation engine 218) format the meeting report for presentation (e.g., rendering and/or display) in a holistic graphical user interface (e.g., as shown in FIG. 3) and/or for presentation in hardcopy format (e.g., for printing). The presentation may occur on a system remote from the voice identification and meeting analysis system (e.g., a web browser or mobile application of a client device).

In some embodiments, the voice identification and meeting analysis system generates the holistic graphical user interface based on one or more meetings reports (e.g., meeting reports 244). The meeting analysis engine may generate a meeting report based on one or more of the steps 702-724. For example, the meeting report may include identifiers of meeting participants (e.g., name, picture and/or other user profile information), locations of meeting participants, a graphical representation of the location of meeting participants, a timeline representation of the transcribed segments, audio clips of the segments, and/or the like. The presentation engine may render the report in a graphical user interface format.

The method 700 may be performed any number of times (e.g., for different meetings). For example, during a first time period (e.g., a first meeting conducted on Jan. 1, 2018) meeting participant Patrick may have had to create a new voiceprint (e.g., because he is a new or unrecognized user). Accordingly, the voice identification and meeting analysis system may analyze and link a participant identifier of Patrick to various segments of the meeting audio data of the first meeting using both his voiceprint and his localization information (e.g., he is in the position of meeting participant 106*a*). However, during a second time period (e.g., a second meeting conducted on Apr. 10, 2018), Patrick's voiceprint may have matured. Accordingly, the voice identification and meeting analysis system may analyze and link the participant identifier of Patrick to various segments of additional meeting audio data of the second meeting using only his voiceprint and not using his localization information. Thus, for example, if Patrick were to move to a different location during the first meeting (e.g., he walked close to the location of meeting participant 106*f*), then the voice identification and meeting analysis system may incorrectly attribute Patrick's speech to the meeting participant 106*f*. However, this may not be case during the second meeting, since Patrick's voiceprint has matured. Accordingly, even if Patrick moved locations during the second meeting, the voice identification and meeting analysis system may accurately attribute Patrick's speech to Patrick since a mature voiceprint may be used without localization information to determine a speaker's identity.

In some embodiments, some or all of the steps of method 700 may be performed in real-time and in batches (e.g., after a meeting has been concluded). For example, the voice identification and meeting analysis system may determine whether a voiceprint needs to be created in response to the configuration phrase being recorded (and the voice capturing system provides the recording to the voice identification and meeting analysis system in response to the configuration phrase being recorded). In other examples, meeting participants may be identified as they speak, transcriptions may be generated as the meeting participants speak, segments may be created as a meeting participant stops speaking and/or another meeting participant starts speaking, and/or the like.

Figure 8:
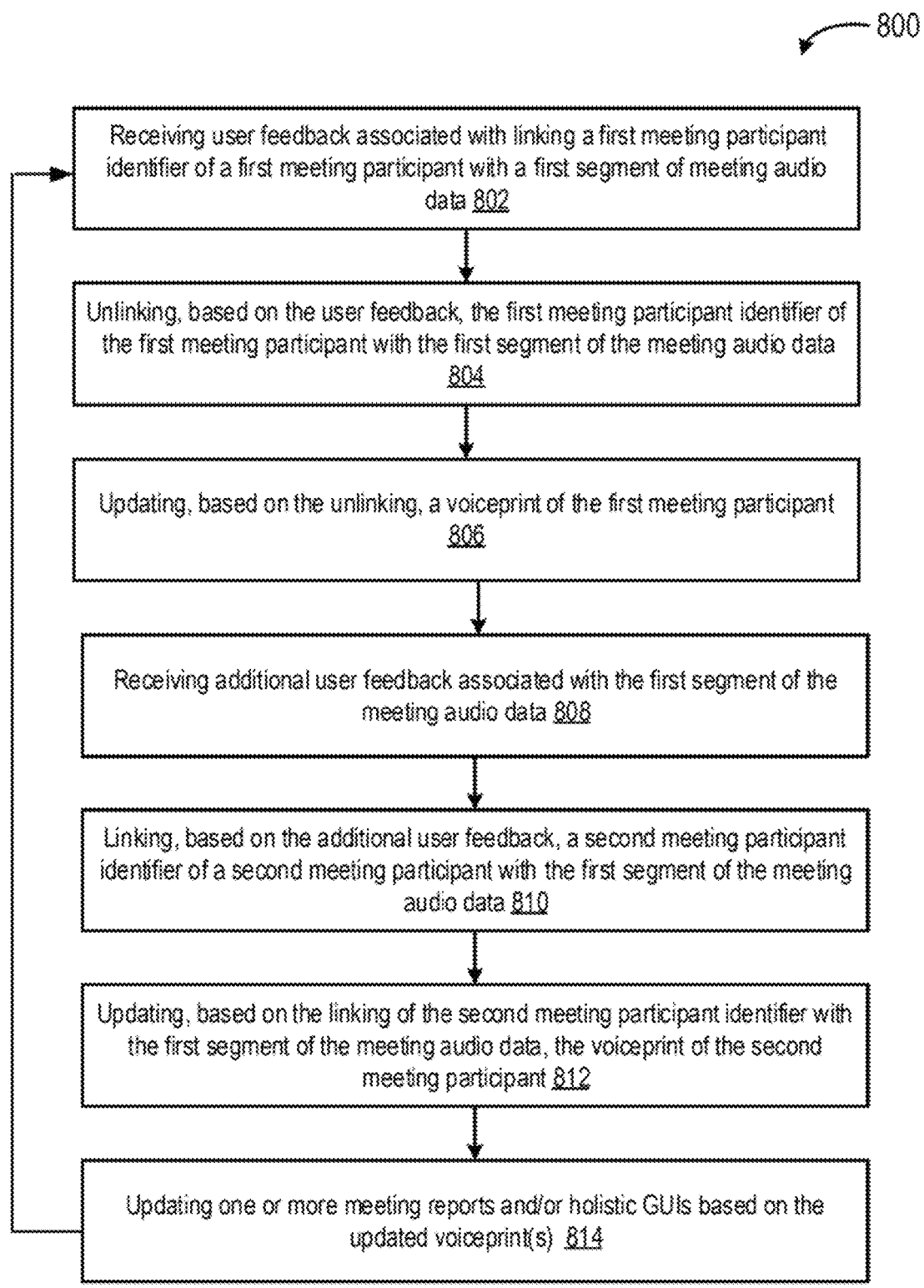
FIG. 8 depicts a flowchart of an example of a method of curated learning according to some embodiments.

FIG. 8 depicts a flowchart of an example of a method 800 of curated learning according to some embodiments. In this and other flowcharts and/or sequence diagrams, the flowchart illustrates by way of example a sequence of steps. It should be understood the steps may be reorganized for parallel execution, or reordered, as applicable. Moreover, some steps that could have been included may have been removed to avoid providing too much information for the sake of clarity and some steps that were included could be removed, but may have been included for the sake of illustrative clarity.

In step 802, a voice identification and meeting analysis system (e.g., voice identification and meeting analysis system) receives user feedback associated with linking a first meeting participant identifier (e.g., #1234) of the first meeting participant (e.g., Patrick) with a first segment (e.g., timestamp 1:00:03 to 1:00:34) of meeting audio data (e.g., meeting audio data 234). In some embodiments, a curated learning engine (e.g., curated learning engine 216) receives the user feedback. For example, the user feedback may be received from an holistic graphical user interface (e.g., holistic graphical user interface 400). The user feedback may be received over a network (e.g., communications network 108) via a communication engine (e.g., communication engine 220) and provided to the curated learning engine.

In step 804, the voice identification and meeting analysis system unlinks, based on the user feedback, the first meeting participant identifier of the first meeting participant with the first segment of the meeting audio data. In some embodiments, the curated learning engine performs the unlinking.

In step 806, the voice identification and meeting analysis system updates, based on the unlinking, a voiceprint (e.g., voiceprint 238) of the first meeting participant. The voiceprint may be stored in a user profile (e.g., user profile 240) of the first meeting participant. In some embodiments, the curated learning engine and/or a voiceprint generation engine (e.g., voiceprint generation engine 206) updates the voiceprint of the first meeting participant. For example, the curated learning engine may instruct the voiceprint generation engine to update the voiceprint in the user profile of the first meeting participant.

In step 808, the voice identification and meeting analysis system receives additional user feedback associated with the first segment of the meeting audio data. The additional user feedback may indicate that a second meeting participant (e.g., Corinne) is the meeting participant speaking during the first segment of the meeting audio data. In some embodiments, the additional user feedback may be received through a holistic graphical user interface (e.g., holistic graphical user interface 400). The user feedback may be received over the network via the communication engine and provided to the curated learning engine.

In step 810, the voice identification and meeting analysis system links, based on the additional user feedback, a second meeting participant identifier of a second meeting participant with the first segment of the meeting audio data. In some embodiments, the curated learning engine performs the linking.

In step 812, the voice identification and meeting analysis system updates, based on the linking of the second meeting participant identifier with the first segment of the meeting audio data, the voiceprint of the second meeting participant. In some embodiments, the curated learning engine and/or the voiceprint generation engine performs the updates. For example, the curated learning engine may instruct the user profile engine to update the voiceprint in the user profile of the second meeting participant.

In step 814, the voice identification and meeting analysis system updates one or more meetings reports (e.g., meeting reports 244) and/or holistic GUIs (e.g., holistic graphical user interface 300 or holistic graphical user interface 400). For example, the updates may include analyzing previous meeting reports which include the first and/or second meeting participant (or their corresponding meeting participant identifier) based on the updated voiceprint of the first and/or second meeting participant.

Figure 9:
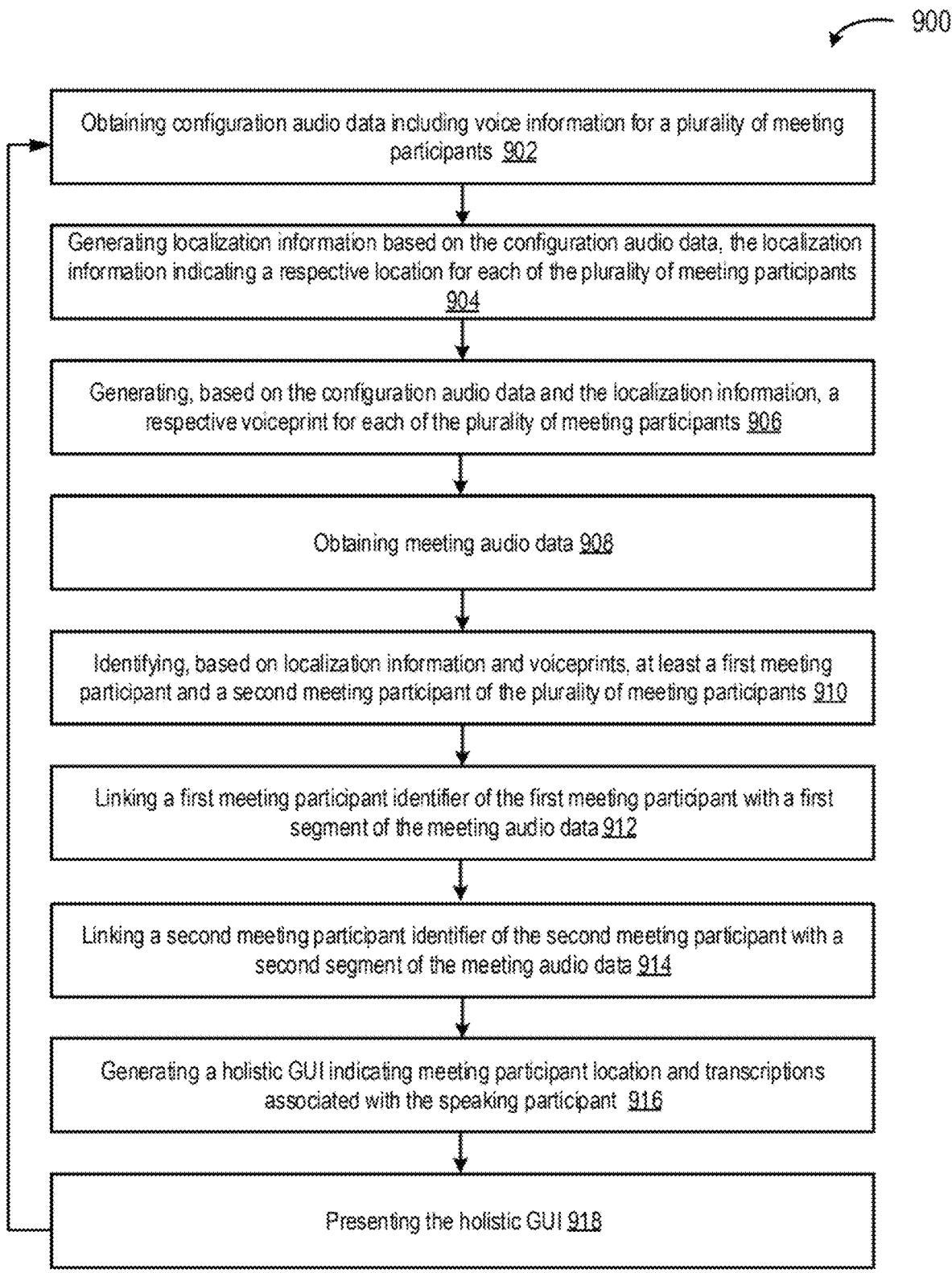
FIG. 9 depicts a flowchart of an example of a method of identifying voices of meeting participants and generating a corresponding holistic graphical user interface according to some embodiments.

FIG. 9 depicts a flowchart of an example of a method 900 of identifying voices of meeting participants and generating a corresponding holistic graphical user interface according to some embodiments.

In step 902, a voice identification and meeting analysis system (e.g., voice identification and meeting analysis system 104) obtains configuration audio data (e.g., configuration audio data 232). The configuration audio data may include voice information for a plurality of meeting participants (e.g., meeting participants 106) recorded during a configuration phase. For example, the configuration phase may occur prior to a meeting, and may include meeting participants to verbally recite a predetermined phrase.

The voice information may be captured by one or more microphones of a plurality of microphones (e.g., one or more microphones 502 of a voice capturing system 102). Directional may be unidirectional or omnidirectional. In some embodiments, the voice identification and meeting analysis system receives the configuration audio data from a voice capturing system over a network (e.g., communications network 108).

In some embodiments, a first set of microphones of the plurality of microphones is disposed in a first directional audio recording device (e.g., voice capturing system 102-1), and a second set of microphones of the plurality of microphones is disposed in a second directional audio recording device (e.g., voice capturing system 102-N) distinct and remote from the first directional audio recording device.

In some embodiments, the first segment of the meeting audio data is captured by the first directional audio recording device, and the second segment of the meeting audio data is captured by the second directional audio recording device.

In step 904, the voice identification and meeting analysis system generates localization information (e.g., localization information 236) based on the configuration audio data. The localization information may indicate a respective location for each of the plurality of meeting participants. In some embodiments, a localization engine (e.g., localization engine 204) generates the localization information.

In step 906, the voice identification and meeting analysis system generates, based on the configuration audio data and the localization information, a respective voiceprint (e.g., voiceprint 238) for each of the plurality of meeting participants. In some embodiments, a voiceprint generation engine (e.g., voiceprint generation engine 206) generates the voiceprints.

In some embodiments, step 906, like one or more of the other steps, may be optional. For example, some meeting participants may already have a voiceprint (e.g., stored in a corresponding user profile 240). Accordingly, this step may skipped for such meeting participants.

In step 908, the voice identification and meeting analysis system obtains meeting audio data (e.g., meeting audio data 234). The meeting audio data may include voice information (or, data) for the plurality of meeting participants recorded during a meeting. The voice information may be captured by one or more microphones of a plurality of microphones (e.g., one or more microphones 502 of a voice capturing system 102). In some embodiments, the voice identification and meeting analysis system receives the meeting audio data from a voice capturing system over a network.

In step 910, the voice identification and meeting analysis system identifies at least a first meeting participant and a second meeting participant of the plurality of meeting participants. The voice identification and meeting analysis system may perform the identification based on the localization information and the respective voiceprints. In some embodiments, a user identification engine (e.g., user identification engine 210) performs the identification.

In step 912, the voice identification and meeting analysis system links a first meeting participant identifier (e.g., a meeting participant identifier of a user profile 240) of the first meeting participant with a first segment of the meeting audio data. The voice identification and meeting analysis system may perform the linking based on the identification of the first meeting participant of the plurality of meeting participants. In some embodiments, a meeting analysis engine (e.g., meeting analysis engine 214) performs the linking.

In step 914, the voice identification and meeting analysis system links a second meeting participant identifier (e.g., another meeting participant identifier of another user profile 240) of the second meeting participant with a second segment of the meeting audio data. The voice identification and meeting analysis system may perform the linking based on the identification of the second meeting participant of the plurality of meeting participants. In some embodiments, the meeting analysis engine performs the linking.

In some embodiments, the voice identification and meeting analysis system links meeting participant identifiers with one or more transcriptions (e.g., a NUANCE transcription, a GOOGLE transcription, transcriptions in different languages, and/or the like) of segment(s) of audio data (e.g., configuration audio data 232, meeting audio data 234). As used herein, "linking" a meeting participant identifier with meeting audio data (e.g., meeting audio data 234), or portion(s) thereof (e.g., "segments"), may refer to linking the meeting participant identifier to at least a portion of audio data (e.g., an audio clip) and/or one or more transcriptions of meeting audio data.

In some embodiments, steps 908-914 may be performed at least during a first time period. The first time period may be a time period directly after a configuration phase (e.g., steps 902-906), or another time period wherein the respective voiceprint(s) are not yet mature (e.g., localization information is still needed to identify meeting participants).

In step 916, the voice identification and meeting analysis system generates a holistic graphical user interface (GUI)

(e.g., holistic graphical user interface 300) indicating the respective locations of the first and second meeting participants of the plurality of meeting participants. The holistic GUI may also indicate a first transcription (e.g., a NUANCE transcription 246) of the first segment and a second transcription (a NUANCE transcription 246) of the second segment. The first transcription may be associated with the first meeting participant in the holistic GUI, and the second transcription may be associated with the second meeting participant in the holistic GUI.

In some embodiments, the meeting analysis engine generates a meeting report (e.g., meeting report 244), and a presentation engine (e.g., presentation engine 218) presents the holistic graphical user interface (step 918). The meeting report 244 may include, for example, links between meeting participant identifiers and segments and/or transcriptions of meeting audio data and/or configuration audio data, configuration audio data files, meeting audio data files (e.g., audio clips of segments), timestamps of events (e.g., start and stop times for segments), the meeting participants of the meeting, a timeline representation of the segments, and/or the like. The meeting report 244 may be formatted for presentation in a holistic graphical user interface (e.g., as shown in FIG. 3) and/or it may be formatted for hardcopy presentation (e.g., printing).

In some embodiments, the holistic GUI indicates a third transcription (e.g., a GOOGLE transcription 246) of the first segment and a fourth transcription (e.g., a GOOGLE transcription) of the second segment. The third transcription may be associated with the first meeting participant in the holistic GUI, and the fourth transcription being associated with the second meeting participant in the holistic GUI.

In some embodiments, the holistic GUI indicates a first voice recording (e.g., an first audio clip) of the first segment and a second voice recording (e.g., a second audio clip) of the second segment. The first voice recording may be associated with the first meeting participant in the holistic GUI, and the second voice recording may be associated with the second meeting participant in the holistic GUI. The first and second voice recording may be played back within the holistic graphical user interface (e.g., responsive to user input).

Figure 10:
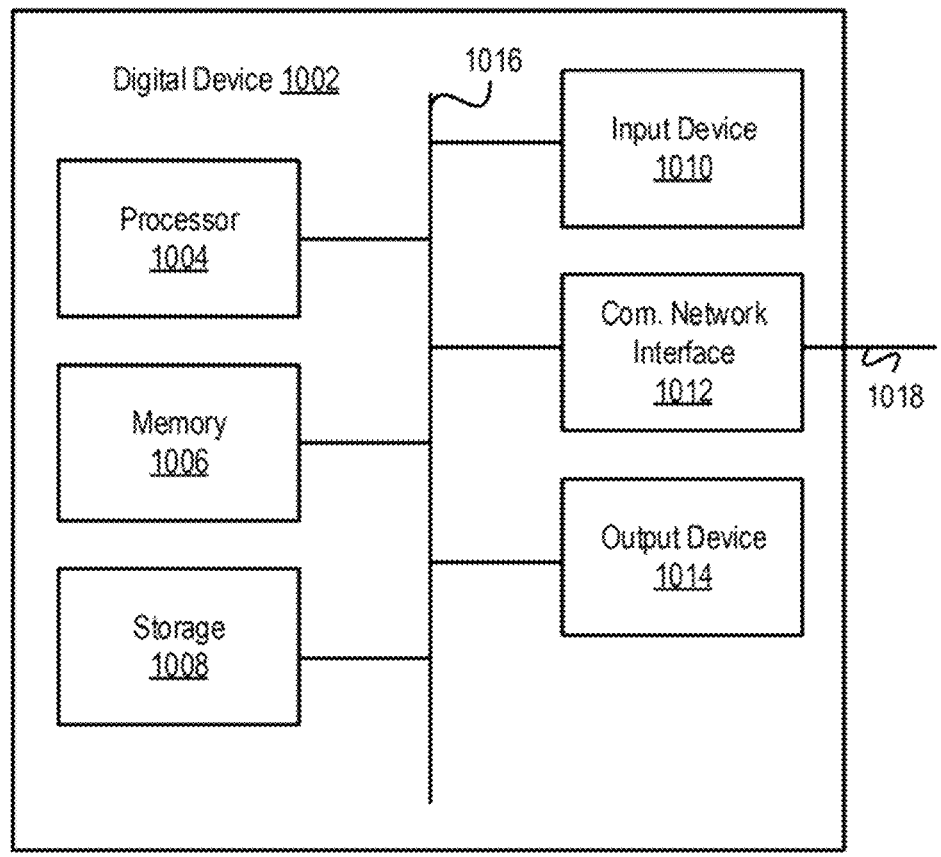
FIG. 10 is a diagram of an example computer system for implementing the features disclosed herein according to some embodiments.

FIG. 10 depicts a diagram of an example of a computing device 1002. Any of the systems, engines, datastores, and/or networks described herein may comprise an instance of one or more computing devices 1002. In some embodiments, functionality of the computing device 1002 is improved to the perform some or all of the functionality described herein. The computing device 1002 comprises a processor 1004, memory 1006, storage 1008, an input device 1010, a communication network interface 1012, and an output device 1014 communicatively coupled to a communication channel 1016. The processor 1004 is configured to execute executable instructions (e.g., programs). In some embodiments, the processor 1004 comprises circuitry or any processor capable of processing the executable instructions.

The memory 1006 stores data. Some examples of memory 1006 include storage devices, such as RAM, ROM, RAM cache, virtual memory, etc. In various embodiments, working data is stored within the memory 1006. The data within the memory 1006 may be cleared or ultimately transferred to the storage 1008.

The storage 1008 includes any storage configured to retrieve and store data. Some examples of the storage 1008 include flash drives, hard drives, optical drives, cloud storage, and/or magnetic tape. Each of the memory system 1006 and the storage system 1008 comprises a computer-readable medium, which stores instructions or programs executable by processor 1004.

The input device 1010 is any device that inputs data (e.g., mouse and keyboard). The output device 1014 outputs data (e.g., a speaker or display). It will be appreciated that the storage 1008, input device 1010, and output device 1014 may be optional. For example, the routers/switchers may comprise the processor 1004 and memory 1006 as well as a device to receive and output data (e.g., the communication network interface 1012 and/or the output device 1014).

The communication network interface 1012 may be coupled to a network (e.g., network 108 or 608) via the link 1018. The communication network interface 1012 may support communication over an Ethernet connection, a serial connection, a parallel connection, and/or an ATA connection. The communication network interface 1012 may also support wireless communication (e.g., 802.11 a/b/g/n, WiMax, LTE, WiFi). It will be apparent that the communication network interface 1012 may support many wired and wireless standards.

It will be appreciated that the hardware elements of the computing device 1002 are not limited to those depicted in FIG. 10. A computing device 1002 may comprise more or less hardware, software and/or firmware components than those depicted (e.g., drivers, operating systems, touch screens, biometric analyzers, and/or the like). Further, hardware elements may share functionality and still be within various embodiments described herein. In one example, encoding and/or decoding may be performed by the processor 1004 and/or a co-processor located on a GPU (i.e., NVIDIA GPU).

It will be appreciated that an "engine," "system," "datastore," "device," and/or "database" may comprise software, hardware, firmware, and/or circuitry. In one example, one or more software programs comprising instructions capable of being executable by a processor may perform one or more of the functions of the engines, datastores, databases, or systems described herein. In another example, circuitry may perform the same or similar functions. Alternative embodiments may comprise more, less, or functionally equivalent engines, systems, datastores, or databases, and still be within the scope of present embodiments. For example, the functionality of the various systems, engines, datastores, and/or databases may be combined or divided differently. The datastore or database may include cloud storage. It will further be appreciated that the term "or," as used herein, may be construed in either an inclusive or exclusive sense. Moreover, plural instances may be provided for resources, operations, or structures described herein as a single instance.

The datastores described herein may be any suitable structure (e.g., an active database, a relational database, a self-referential database, a table, a matrix, an array, a flat file, a documented-oriented storage system, a non-relational NoSQL system, and the like), and may be cloud-based or otherwise.

The systems, methods, engines, datastores, and/or databases described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The present invention(s) are described above with reference to example embodiments. It will be apparent to those skilled in the art that various modifications may be made and other embodiments may be used without departing from the broader scope of the present invention(s). Therefore, these and other variations upon the example embodiments are intended to be covered by the present invention(s).

The invention claimed is:

1. A system comprising:
one or more processors; and
memory storing instructions that, when executed by the one or more processors, cause the system to perform:
obtaining configuration audio data including voice information from a plurality of meeting participants in a meeting room, the voice information captured by one or more microphones of a plurality of microphones in the meeting room, each of the plurality of microphones having a respective position relative to each other, the voice information from each participant of the plurality of participants including a respective participant identifier;
generating localization information based on the configuration audio data and on the respective positions of the plurality of microphones, the localization information indicating a respective location of each participant of the plurality of meeting participants in the meeting room, the respective location of each participant being associated with the respective participant identifier;
generating, based on the configuration audio data and the localization information, a respective voiceprint for each of the plurality of meeting participants, the respective voiceprint being associated with the respective participant identifier;
at least during a first time period:
obtaining first meeting audio data;
identifying, based on the localization information and the respective voiceprints, a first segment of the first meeting audio data as associated with a first meeting participant of the plurality of meeting participants and a second segment of the first meeting audio data as associated with a second meeting participant of the plurality of meeting participants;
linking a first meeting participant identifier of the first meeting participant with the first segment of the first meeting audio data; and
linking a second meeting participant identifier of the second meeting participant with the second segment of the first meeting audio data;
updating the respective voiceprint of the first meeting participant based on the first segment of the first meeting audio data;
updating the respective voiceprint of the second meeting participant based on the second segment of the first meeting audio data; and
generating a holistic graphical user interface (GUI), the holistic GUI illustrating the respective locations of the first and second meeting participants of the plurality of meeting participants in the meeting room, and the holistic GUI indicating a first transcription of the first segment of the first meeting audio data and a second transcription of the second segment of the first meeting audio data, the first transcription being associated with the first meeting participant in the holistic GUI, and the second transcription being associated with the second meeting participant in the holistic GUI.

2. The system of claim 1, wherein the instructions further cause the system to perform:
at least during a second time period subsequent to the first time period:
obtaining additional meeting audio data;
identifying, based on the respective voiceprints and on a reduced weight of localization information, at least the first meeting participant and the second meeting participant of the plurality of meeting participants;
linking, based on the identification of the first meeting participant, the first meeting participant identifier of the first meeting participant with a first segment of the additional meeting audio data; and
linking, based on the identification of the second meeting participant, the second meeting participant identifier of the second meeting participant with a second segment of the additional meeting audio data.

3. The system of claim 1, wherein the instructions further cause the system to perform:
receiving user feedback associated with the linking the first meeting participant identifier of the first meeting participant with the first segment of the additional meeting audio data;
unlinking, based on the user feedback, the first meeting participant identifier of the first meeting participant with the first segment of the additional meeting audio data; and
updating, based on the unlinking, the respective voiceprint of the first meeting participant.

4. The system of claim 3, wherein the instructions further cause the system to perform:
linking, based on additional user feedback, a third meeting participant identifier of a third meeting participant of the plurality of meeting participants with the first segment of the first meeting audio data; and
updating, based on the linking of the third meeting participant identifier with the first segment of the first meeting audio data, the respective voiceprint of the third meeting participant.

5. The system of claim 1, wherein the holistic GUI indicates a third transcription of the first segment of the first meeting audio data and a fourth transcription of the second segment of the first meeting audio data, the third transcription being associated with the first meeting participant in the holistic GUI, and the fourth transcription being associated with the second meeting participant in the holistic GUI.

6. The system of claim 1, wherein the holistic GUI indicates a first voice recording of the first segment of the first meeting audio data and a second voice recording of the second segment of the first meeting audio data, the first voice recording being associated with the first meeting participant in the holistic GUI, and the second voice recording being associated with the second meeting participant in the holistic GUI.

7. The system of claim 6, wherein each of the first and second voice recordings may be played back within the holistic GUI responsive to user input.

8. The system of claim 1, wherein a first set of microphones of the plurality of microphones is disposed in a first directional audio recording device, and a second set of microphones of the plurality of microphones is disposed in a second directional audio recording device distinct and remote from the first directional audio recording device.

9. The system of claim 8, wherein a first segment of the first meeting audio data is captured by the first directional audio recording device, and the second segment of the first meeting audio data is captured by the second directional audio recording device.

10. The system of claim 1, wherein the voice information includes voice audio data and signal strength data associated with the voice audio data.

11. A method being implemented by a computing system including one or more physical processors and storage media storing machine-readable instructions, the method comprising:
  obtaining configuration audio data including voice information from a plurality of meeting participants in a meeting room, the voice information captured by one or more microphones of a plurality of microphones in the meeting room, each of the plurality of microphones having a respective position relative to each other, the voice information from each participant of the plurality of participants including a respective participant identifier;
  generating localization information based on the configuration audio data and on the respective positions of the plurality of microphones, the localization information indicating a respective location of each participant of the plurality of meeting participants in the meeting room, the respective location of each participant being associated with the respective participant identifier;
  generating, based on the configuration audio data and the localization information, a respective voiceprint for each of the plurality of meeting participants, the respective voiceprint being associated with the respective participant identifier;
  at least during a first time period:
    obtaining first meeting audio data;
    identifying, based on the localization information and the respective voiceprints, a first segment of the first meeting audio data as associated with a first meeting participant of the plurality of meeting participants and a second segment of the first meeting audio data as associated with a second meeting participant of the plurality of meeting participants;
    linking a first meeting participant identifier of the first meeting participant with the first segment of the first meeting audio data; and
    linking a second meeting participant identifier of the second meeting participant with the second segment of the first meeting audio data;
  updating the respective voiceprint of the first meeting participant based on the first segment of the first meeting audio data;
  updating the respective voiceprint of the second meeting participant based on the second segment of the first meeting audio data; and
  generating a holistic graphical user interface (GUI), the holistic GUI illustrating the respective locations of the first and second meeting participants of the plurality of meeting participants in the meeting room, and the holistic GUI indicating a first transcription of the first segment of the first meeting audio data and a second transcription of the second segment of the first meeting audio data, the first transcription being associated with the first meeting participant in the holistic GUI, and the second transcription being associated with the second meeting participant in the holistic GUI.

12. The method of claim 11, further comprising:
at least during a second time period subsequent to the first time period:
  obtaining additional meeting audio data;
  identifying, based on the respective voiceprints and on a reduced weight of localization information, at least the first meeting participant and the second meeting participant of the plurality of meeting participants;
  linking, based on the identification of the first meeting participant, the first meeting participant identifier of the first meeting participant with a first segment of the additional meeting audio data; and
  linking, based on the identification of the second meeting participant, the second meeting participant identifier of the second meeting participant with a second segment of the additional meeting audio data.

13. The method of claim 11, further comprising:
receiving user feedback associated with the linking the first meeting participant identifier of the first meeting participant with the first segment of the additional meeting audio data;
unlinking, based on the user feedback, the first meeting participant identifier of the first meeting participant with the first segment of the additional meeting audio data; and
updating, based on the unlinking, the respective voiceprint of the first meeting participant.

14. The method of claim 13, further comprising:
linking, based on additional user feedback, a third meeting participant identifier of a third meeting participant of the plurality of meeting participants with the first segment of the first meeting audio data; and
updating, based on the linking of the third meeting participant identifier with the first segment of the first meeting audio data, the respective voiceprint of the third meeting participant.

15. The method of claim 11, wherein the holistic GUI indicates a third transcription of the first segment of the first meeting audio data and a fourth transcription of the second segment of the first meeting audio data, the third transcription being associated with the first meeting participant in the holistic GUI, and the fourth transcription being associated with the second meeting participant in the holistic GUI.

16. The method of claim 11, wherein the holistic GUI indicates a first voice recording of the first segment of the first meeting audio data and a second voice recording of the second segment of the first meeting audio data, the first voice recording being associated with the first meeting participant in the holistic GUI, and the second voice recording being associated with the second meeting participant in the holistic GUI.

17. The method of claim 16, wherein each of the first and second voice recordings may be played back within the holistic GUI responsive to user input.

18. The method of claim 11, wherein a first set of microphones of the plurality of microphones is disposed in a first directional audio recording device, and a second set of microphones of the plurality of microphones is disposed in a second directional audio recording device distinct and remote from the first directional audio recording device.

19. The method of claim 18, wherein a first segment of the first meeting audio data is captured by the first directional audio recording device, and the second segment of the first meeting audio data is captured by the second directional audio recording device.

20. The method of claim 11, wherein the voice information includes voice audio data and signal strength data associated with the voice audio data.

\* \* \* \* \*